US012663942B2

(12) United States Patent
Lee

(10) Patent No.: US 12,663,942 B2
(45) Date of Patent: Jun. 23, 2026

(54) STORAGE DEVICE PROVIDING PROTECTION FROM DATA INTERFERENCE

(71) Applicant: SAMSUNG ELECTRONICS CO., LTD., Suwon-si (KR)

(72) Inventor: Jinwook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/752,068

(22) Filed: Jun. 24, 2024

(65) Prior Publication Data

US 2025/0208792 A1     Jun. 26, 2025

(30) Foreign Application Priority Data

Dec. 20, 2023     (KR) ......................... 10-2023-0186493

(51) Int. Cl.
*G06F 3/06*          (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/0614; G06F 3/0619; G06F 3/0644; G06F 3/0656; G06F 3/0655
See application file for complete search history.

(56) References Cited

U.S. PATENT DOCUMENTS 8,874,835 B1 * 10/2014 Davis .................... G06F 3/0679
                                                              711/156
10,241,706 B2     3/2019 Mochizuki et al.
(Continued)

FOREIGN PATENT DOCUMENTS

JP          2014-204315 A     10/2014
JP              6306530 B2     4/2018
(Continued)

OTHER PUBLICATIONS

Goebel, Andre, Ralph Mader, and Ovidiu Tripon. "Performance and Freedom From Interference—a contradiction in embedded automotive multi-core applications?." In ARCS 2017; 30th International Conference on Architecture of Computing Systems, pp. 1-9. VDE, 2017.*

(Continued)

*Primary Examiner* — Tracy A Warren
(74) *Attorney, Agent, or Firm* — Sughrue Mion, PLLC

(57)          ABSTRACT
A storage device includes a memory device having a first erase unit area and a second erase unit area that has a bit density higher than a bit density of the first erase unit area, and a storage controller. The storage controller receives a write command including a tag indicating a danger from a first electronic control unit, based on an automobile safety level of data received with the write command being greater than or equal to a threshold level, stores the data in the first erase unit area, and based on the automobile safety level being lower than the threshold level, stores the data in the second erase unit area, and based on a danger termination signal being received from the first electronic control unit, moves the data received with the write command and stored in the first erase unit area, to the second erase unit area.

19 Claims, 16 Drawing Sheets

(56)         References Cited

U.S. PATENT DOCUMENTS

| | | | |
|---|---|---|---|
| 10,482,289 B2 | 11/2019 | Barr et al. | |
| 10,552,368 B2 | 2/2020 | Ito et al. | |
| 10,967,813 B2 | 4/2021 | Ishigooka et al. | |
| 2012/0246397 A1* | 9/2012 | Nakai | G06F 12/0638 |
| | | | 711/E12.001 |
| 2017/0177258 A1* | 6/2017 | Bates | G06F 3/0634 |
| 2021/0089453 A1 | 3/2021 | Hayakawa et al. | |
| 2021/0119780 A1 | 4/2021 | Hassan et al. | |
| 2021/0318820 A1* | 10/2021 | Jin | G06F 3/0673 |
| 2021/0334018 A1* | 10/2021 | Geng | G06F 3/0655 |
| 2022/0283971 A1 | 9/2022 | Lee et al. | |
| 2022/0350915 A1* | 11/2022 | Zeng | G06F 12/1416 |
| 2023/0036117 A1* | 2/2023 | Krishnani | G06F 11/0757 |
| 2023/0185904 A1 | 6/2023 | Chitnis et al. | |
| 2023/0222061 A1* | 7/2023 | Hamann | G06F 9/52 |
| | | | 711/130 |
| 2024/0256440 A1* | 8/2024 | Pletka | G06F 3/0653 |
| 2024/0427515 A1* | 12/2024 | Pletka | G06F 3/064 |

FOREIGN PATENT DOCUMENTS

| | | | |
|---|---|---|---|
| JP | 6555184 B2 | 8/2019 | |
| JP | 2022-65218 A | 4/2022 | |

OTHER PUBLICATIONS

Communication issued Jan. 9, 2025 by the European Patent Office in European Patent Application No. 24189368.4.

* cited by examiner

| ASIL Definition | | C1 | C2 | C3 |
|---|---|---|---|---|
| S1 | E1 | QM | QM | QM |
| | E2 | QM | QM | QM |
| | E3 | QM | QM | A |
| | E4 | QM | A | B |
| S2 | E1 | QM | QM | QM |
| | E2 | QM | QM | A |
| | E3 | QM | A | B |
| | E4 | A | B | C |
| S3 | E1 | QM | QM | A |
| | E2 | QM | A | B |
| | E3 | A | B | C |
| | E4 | B | C | D |

FIG. 2

| CMD | | Byte3 | Byte2 | Byte1 | Byte0 |
|-----|---|-------|-------|-------|-------|
| | | 31:24 | 23:16 | 15:8 | 7:0 |
| Dword | 0 | | | | Opcode |
| | 1 | NSID | | | |
| | 2 | | | | |
| | ... | | | | |
| | 11 | DSPEC | | DTYPE | DOPER |
| | ... | | | | |
| | 15 | | | | |

FIG. 6A

| DTYPE | Definition |
|-------|-----------|
| 0x03 | ASIL QM |
| 0x13 | ASIL A |
| 0x23 | ASIL B |
| 0x33 | ASIL C |
| 0x43 | ASIL D |
| 0x53 | Reserved for other ASIL Grade |

FIG. 6B

| | NSID | ASIL |
|---|---|---|
| ECU1(110) | 1 | B, D |
| ECU2(120) | 2 | A, QM |
| ECU3(130) | 3 | A, B |
| ECU4(140) | 4 | B, C |

FIG. 8A

| Logical Address | Physical Address | Tag |
|---|---|---|
| LBA1 | PPN1 | A |
| LBA2 | PPN2 | QM |
| LBA3 | PPN3 | D |

FIG. 8B

|  | VFID | ASIL |
|---|---|---|
| ECU1 | VF1 | B, D |
| ECU2 | VF2 | A, QM |
| ECU3 | VF3 | B, C |

FIG. 16

STORAGE DEVICE PROVIDING PROTECTION FROM DATA INTERFERENCE

CROSS-REFERENCE TO RELATED APPLICATION

This application claims priority to Korean Patent Application No. 10-2023-0186493 filed on Dec. 20, 2023 in the Korean Intellectual Property Office, the contents of which being incorporated by reference herein in its entirety.

BACKGROUND

Example embodiments relate to a storage device, and more particularly, to a storage device which may store data of an autonomous vehicle.

Recently, in the automobile industry, various devices or systems have been developed to provide driving convenience for users. As an example, an automotive electronic system may provide autonomous driving or various user experiences using semiconductor integrated circuits. The automotive electronic system may provide convenience in driving cars through a semiconductor integrated circuit or may provide various infotainment through a semiconductor integrated circuit.

When an error occurs in an automotive electronic system, the error may lead to safety concerns in the automotive electronic system. That is, the error may lead to a decrease in user safety. Accordingly, an ISO 26262 criterion defines automotive safety integrity levels (ASIL) for various hardware devices or intellectual property (IP) blocks used in an automotive electronic system. Hardware devices or IP blocks may operate or communicate with each other depending on their automobile safety levels defined in the ISO 26262 criterion. However, in some circumstances, interference (i.e., unintended communication) may occur between hardware devices or IP blocks, which may cause a decrease in safety of drivers.

SUMMARY

It is an aspect to provide a storage device which may prevent interference (e.g., unintentional communication) between hardware devices of an autonomous vehicle and may improve safety of an autonomous vehicle based on a safety level of data generated by hardware devices.

It is another aspect to provide a storage device which may effectively collect emergency data of an autonomous vehicle.

According to an aspect of one or more example embodiments, there is provided a storage device comprising a memory device having a plurality of erase unit areas including a first erase unit area and a second erase unit area, the second erase unit area having a second bit density higher than a first bit density of the first erase unit area; and a storage controller configured to receive a write command including a tag indicating a danger from a first electronic control unit among a plurality of electronic control units, based on an automobile safety level of data received with the write command being greater than or equal to a threshold level, store the data in the first erase unit area, and based on the automobile safety level of the data being lower than the threshold level, store the data in the second erase unit area; and based on a danger termination signal being received from the first electronic control unit, move the data received with the write command and stored in the first erase unit area, to the second erase unit area.

According to another aspect of one or more example embodiments, there is provided a storage device comprising a memory device including a plurality of erase unit areas; and a storage controller configured to receive a write command and data from a first electronic control unit among a plurality of electronic control units, obtain an automobile safety level of a vehicle function that generated the write command from a tag included in the write command, and control the memory device to store the data in the plurality of erase unit areas depending on the automobile safety level of the vehicle function, wherein the storage controller controls the memory device to store pieces of the data having different automobile safety levels in different erase unit areas of the plurality of erase unit areas.

According to yet another aspect of one or more example embodiments, there is provided a storage device comprising a memory device; and a storage controller configured to control the memory device. The storage controller includes a packet manager configured to obtain a logical address included in a read command from a first electronic control unit among a plurality of electronic control units and to obtain an automobile safety level included in a tag of the read command; an access manager configured to determine whether a first automobile safety level included in the tag is greater than or equal to a second automobile safety level of data having been written previously in the memory device by the first electronic control unit; and a flash translation layer (FTL) configured to, based on the first automobile safety level being greater than or equal to the second automobile safety level, determine whether the first automobile safety level is greater than or equal to a third automobile safety level of data stored in the logical address, and based on the first automobile safety level being greater than the third automobile safety level, perform a read operation on the logical address.

BRIEF DESCRIPTION OF DRAWINGS

The above and other aspects will be more clearly understood from the following detailed description, taken in combination with the accompanying drawings, in which:

FIG. 2 is a diagram illustrating an example of safety levels of an autonomous vehicle, according to some embodiments;

FIGS. 6A and 6B are diagrams illustrating a structure of a command including a tag according to some example embodiments;

FIG. 8A is a diagram illustrating an access management table according to an example embodiment;

FIG. 8B is a diagram illustrating a map table according to an example embodiment;

FIG. 16 is a diagram illustrating an access management table according to an example embodiment.

DETAILED DESCRIPTION

Hereinafter, various embodiments will be described as follows with reference to the accompanying drawings. As used in this specification, the phrase "at least one of A, B, or C" includes within its scope "only A", "only B", "only C", "A and B", "B and C", "A and C", and "A, B, and C".

Figure 1:
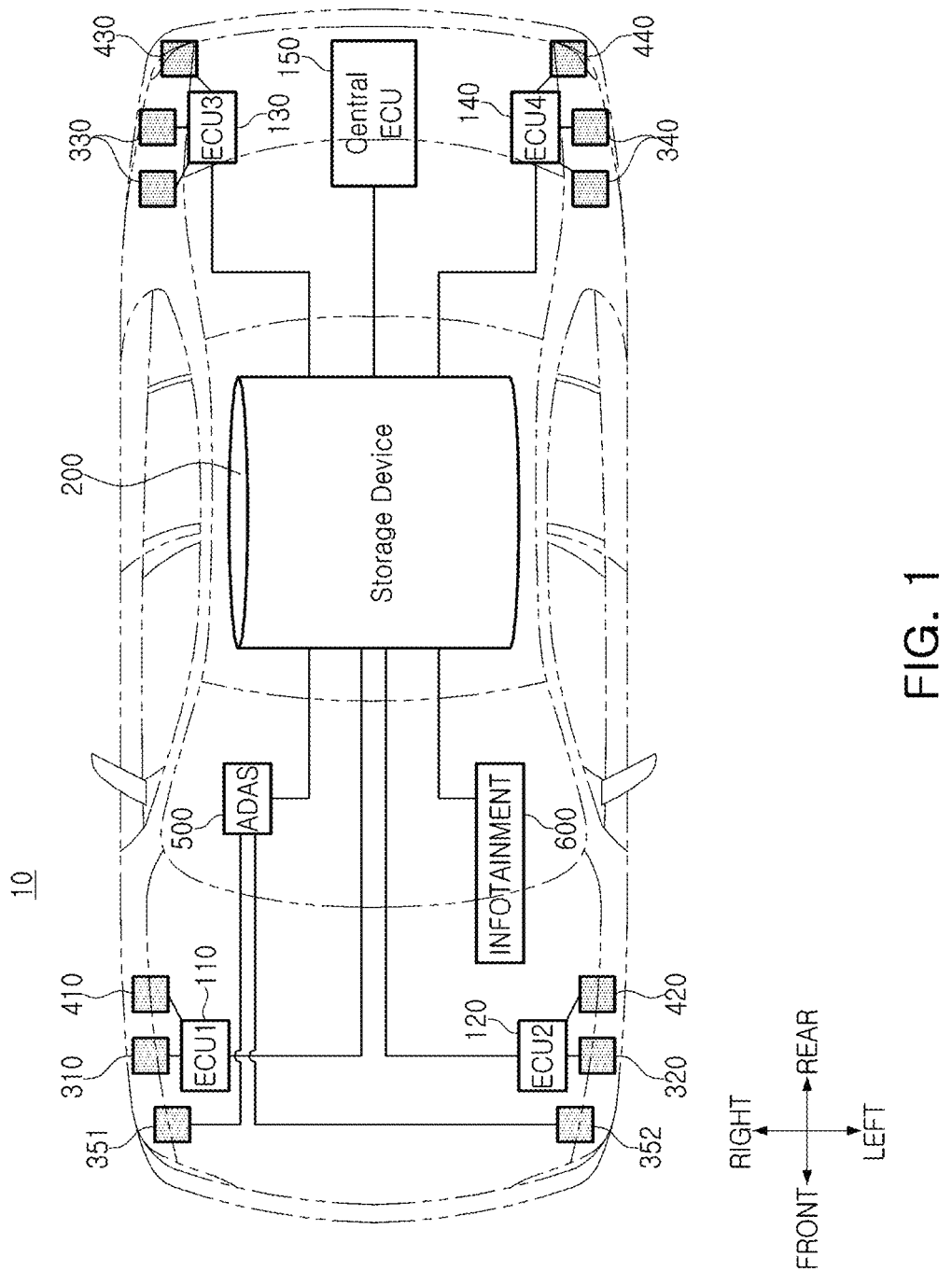
FIG. 1 is a diagram illustrating an autonomous vehicle according to an example embodiment.

FIG. 1 is a diagram illustrating an autonomous vehicle according to an example embodiment.

Referring to FIG. 1, a vehicle 10 may include a plurality of electronic control units (ECU) 110, 120, 130, 140, and 150 (described in more details below), a storage device 200, a plurality of sensors 310, 320, 330, 340, 351, and 352, a plurality of actuators 410, 420, 430, and 440, an advanced driver assistance system (ADAS) 500 and an infotainment system (INFOTAINMENT) 600.

Each of the plurality of electronic control units (ECUs) 110-150 may be electrically, mechanically, and communicatively connected to at least one of the plurality of sensors 310-352 and at least one of the plurality of actuators 410-440 provided in the vehicle 10, and may control operation of at least one device based on one function performance command. For example, the electronic control units 110-150 may sense internal and external conditions of the vehicle 10 using the sensors 310-352 directly or indirectly connected thereto, and may drive the vehicle 10 by controlling the actuators 410-440 directly or indirectly connected thereto according to the sensing result.

The storage device 200 may store data obtained from the plurality of electronic control units (ECUs) 110-150 and may provide the stored data to the plurality of electronic control units 110-150. For example, the plurality of electronic control units 110-150 may provide data generated by the sensors 310-352 and reprocessed data to the storage device 200. The plurality of electronic control units 110-150 may obtain data stored in the storage device 200, may determine whether to use the actuators 410-440 to perform a function based on the obtained data, and may control one or more of the actuators 410-440 to perform the function.

The sensors 310-352 may include various sensors such as, for example, an image sensor, a position sensor, a speed sensor, a pressure sensor, an inertial sensor, and/or a temperature sensor. The actuators 410-440 may include various actuators such as, for example, a throttle actuator, a fuel injection device actuator, a brake actuator, a transmission actuator, a steering actuator, a suspension actuator, a window actuator, and/or a wiper actuator.

The advanced driver assistance system (ADAS) 500 may include a device to improve driver safety and convenience. The ADAS 500 may sense hazardous conditions using data obtained from one or more of the plurality of sensors 310-352, for example, from the sensors 351 and 352. The ADAS 500 may provide an adaptive cruise control function, a lane departure warning function, a lane keeping assist function, a collision prevention function including an automatic emergency braking function, and/or a blind spot monitoring function, etc. by controlling one or more of the plurality of electronic control units 110-150 depending on the sensing of hazardous conditions.

The infotainment system (INFOTAINMENT) 600 may improve a driving experience of a vehicle driver by providing audio, video, navigation, and/or communication functions.

The vehicle 10 may be electrically, mechanically, and communicatively connected to the plurality of electronic control units 110-150, and may further include a connection control device for performing communication with the plurality of electronic control units 110-150, respectively.

The connection control device may communicate with a server through wireless communication. Wireless communication between the connection control devices and a server may include various wireless communication methods such as global system for mobile communication (GSM), code division multiple access (CDMA), wideband code division multiple access (WCDMA), universal mobile telecommunications system (UMTS), time division multiple access (TDMA), and/or long term evolution (LTE). In some embodiments, the connection control device may include a Wi-Fi module and wireless broadband module.

As autonomous driving techniques of the vehicle 10 have been developed, the vehicle 10 may have dozens or more sensors 310-352 and dozens or more actuators 410-440, and vehicle functions have become more complex. When multiple vehicle functions are individually controlled using individual electronic control units, networking between vehicle functions may become difficult and introduction of new vehicle functions may become difficult.

To enhance networking and scalability between vehicle functions, the plurality of sensors 310-352 and the plurality of actuators 410-440 may be grouped into a plurality of zones depending positions thereof in the vehicle 10, and electronic control units for each zone may be introduced.

In the example illustrated in FIG. 1, the plurality of vehicle control devices 110-150 may include a first electronic control unit (ECU1) 110 connected to the sensor 310 and the actuator 410 disposed on the front right side of the vehicle 10, a second electronic control unit (ECU2) 120 connected to the sensor 320 and the actuator 420 disposed on the front left of the vehicle 10, a third electronic control unit (ECU3) 130 connected to the sensor 330 and the actuator 430 disposed on the rear right side of the vehicle 10, a fourth electronic control unit (ECU4) 140 connected to the sensor 340 and the actuator 440 disposed on the rear left side of the vehicle 10, and a central electronic control unit (Central ECU) 150 for controlling the plurality of electronic control units (ECU1-ECU4) 110-140.

Each of the electronic control units (ECUs) 110-150 may execute a plurality of vehicle functions. For example, each of the vehicle functions may be implemented as software such as an application, or by hardware such as firmware. In each of the electronic control units 110-150, a plurality of vehicle functions may be networked, vehicle functions may be updated, and/or new vehicle functions may be introduced.

The storage device 200 may be shared by the plurality of electronic control units 110-150. Since data of a plurality of electronic control units 110-150 may be easily shared, networking between vehicle functions and scalability of vehicle functions may be further strengthened.

Depending on a safety level required for vehicle functions, an automobile safety level may be assigned to the vehicle functions. An example of the automobile safety level may include an automotive safety integrity level (ASIL). For example, among various vehicle functions, a brake function requiring a high safety level may be assigned with the ASIL D level, which is the highest level, and a rear lighting function may be assigned with the ASIL A level, which is a relatively low level.

The ISO 26262 criterion requires ensuring that there is no interference between vehicle functions having different automobile safety levels. The requirement may be referred to as freedom from interference (FFI).

In the plurality of electronic control units (ECUs) 110-150, multiple vehicle functions having different automobile safety levels may generate data, and the generated data may be stored in the storage device 200. When the storage device 200 is shared by the plurality of electronic control units 110-150, unintentional interference may occur between different vehicle functions.

In particular, when a vehicle function having a relatively low level accesses data generated by a vehicle function having a relatively high level among pieces of data stored in the storage device 200, or when the vehicle function having the relatively low level changes the data generated by the vehicle function having the relatively high level among the pieces of data stored in the storage device 200 due to interference in the storage device 200, or when data from the vehicle function having the relatively low level causes interference the data generated by the vehicle function having the relatively high level among the pieces of data stored in the storage device 200, the safety of the vehicle may be adversely affected.

As a first example in which a specific vehicle function changes data of another vehicle function stored in the storage device 200, a specific vehicle function may directly change data by providing a write command for a logical address allocated to the data to the storage device 200. As a second example, when a specific vehicle function accesses an area surrounding a physical area in which the data is stored in the storage device 200, the data may be damaged due to read disturbance and program disturbance due to physical characteristics of the storage device 200.

According to an example embodiment, the storage device 200 may satisfy freedom from interference (FFI) requirements and may improve vehicle safety by preventing a specific vehicle function from unintentionally accessing, changing or interfering with data of another vehicle function.

FIG. 2 is a diagram illustrating an example of safety levels of an autonomous vehicle, according to some embodiments.

Referring to FIG. 2, an automotive safety integrity level (ASIL) may be determined according to levels of S1-S3, E1-E4, and C1-C3. The levels S1, S2, and S3 may indicate a severity level of potential disaster or danger in vehicle operation. S1 may indicate the level indicating light and medium injuries, S2 may indicate the level indicating survival and life-threatening injuries (survivable), and S3 may indicate the level indicating life-threatening injuries (survival is unspecific) or fatal injuries.

The levels E1, E2, E3, and E4 may indicate a level of exposure to risks and disasters. E1 may indicate a level with very low exposure to risks and disasters, E2 may indicate a level with low exposure to risks and disasters, E3 may indicate a level with medium exposure to risks and disasters, and E4 may indicate a level with extremely high exposure to risks and disasters.

The levels C1, C2, and C3 may indicate disaster controllability level. C1 may indicate a level which may be simply controlled, C2 may indicate a level which may be generally controlled, and C3 may indicate a level which may not be controlled or may be difficult to control.

The automotive safety integrity levels (ASILs) may be divided into levels of QM, A, B, C, and D. The level QM may indicate a level unrelated to vehicle function safety. The levels A, B, C, and D may indicate higher levels in the order of A, B, C, and D, with A being the lowest level and D being the highest level. The higher the ASIL, the higher the level of danger due to malfunction may be. In other words, the higher the ASIL, the higher the safety requirements may be.

Below, example embodiments will be described based on the automotive safety integrity levels (ASILs) defined by the ISO 26262 criterion, but example embodiments are not limited thereto. For example, in the example embodiments, safety levels defined by IEC 61508 criterion, a comprehensive function safety criterion for general electronic device safety, or function safety criterions for various other industries (railways, ports, aviation, communications, or the like) may be used, and/or may be applied therewith.

Figure 3:
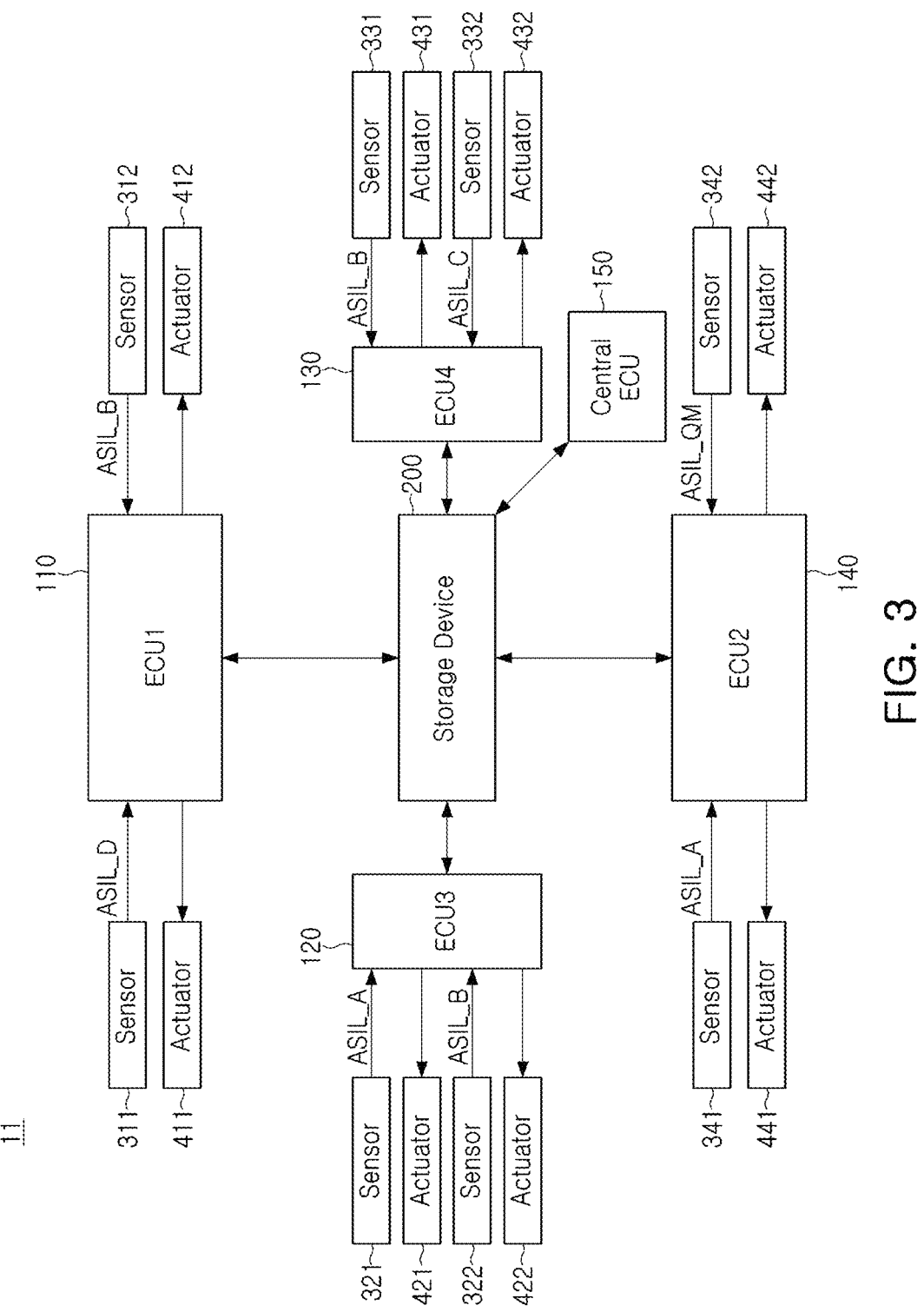
FIG. 3 is a diagram illustrating a vehicle system according to an example embodiment.

FIG. 3 is a diagram illustrating a vehicle system according to an example embodiment.

A vehicle system 11 may include a plurality of electronic control units (ECUs) 110, 120, 130, 140, and 150, a storage device 200, a plurality of sensors 311, 312, 321, 322, 331, 332, 341, and 342, and a plurality of actuators 411, 412, 421, 422, 431, 432, 441, and 442.

The plurality of electronic control units (ECUs) 110-150 may correspond to the plurality of electronic control units (ECUs) 110-150 described with reference to FIG. 1. In other words, the first to fourth electronic control units (ECU1-ECU4) 110-140 may control sensors and actuators disposed in different zones of the vehicle, and the central electronic control unit (Central ECU) 150 may control the first to fourth electronic control units (ECU1-ECU4) 110-140.

The first electronic control unit (ECU1) 110 may control the sensors 311 and 312 and the actuators 411 and 412, the second electronic control unit (ECU2) 120 may control the sensors 321 and 322 and the actuators 421 and 422, the third electronic control unit (ECU3) 130 may control the sensors 331 and 332 and the actuators 431 and 432, and the fourth electronic control unit (ECU4) 140 may control the sensors 341, 342 and the actuators 441 and 442.

Sensors 311-342 may generate various types of data, and the data may be used to control various vehicle functions. For example, to control a brake function, the sensor 311 may sense a position and may generate position data.

An importance of data generated from the sensors 311-342 may vary depending on a safety level of the vehicle function for which the data is used. For example, the data generated to control a brake function having an ASIL D level may be managed as more important data than data to control the vehicle function having a level lower than the ASIL D level in the vehicle system 11, and the data generated to control a brake function having an ASIL D level may be managed to not be changed by a vehicle function having a lower level.

According to an example embodiment, the storage device 200 may include a plurality of erase unit areas including memory cells which may be erased simultaneously, and may store pieces of data having different automobile safety levels in different erase unit areas.

According to an example embodiment, when data is stored separately in different erase unit areas depending on an automobile safety level, when accessing data having a relatively low automobile safety level, the issue of data having a relatively high automobile safety level being damaged due to read disturbance and program disturbance may be prevented.

According to an example embodiment, the storage device 200 may obtain an automobile safety level of a vehicle function which tries to access data from an electronic control unit, and may selectively allow access to data depending on the obtained automobile safety level. When access to data is selectively allowed depending on an automobile safety level, a vehicle function having a relatively low vehicle level may be prevented from accessing data having a relatively high automobile safety level.

Figure 4:
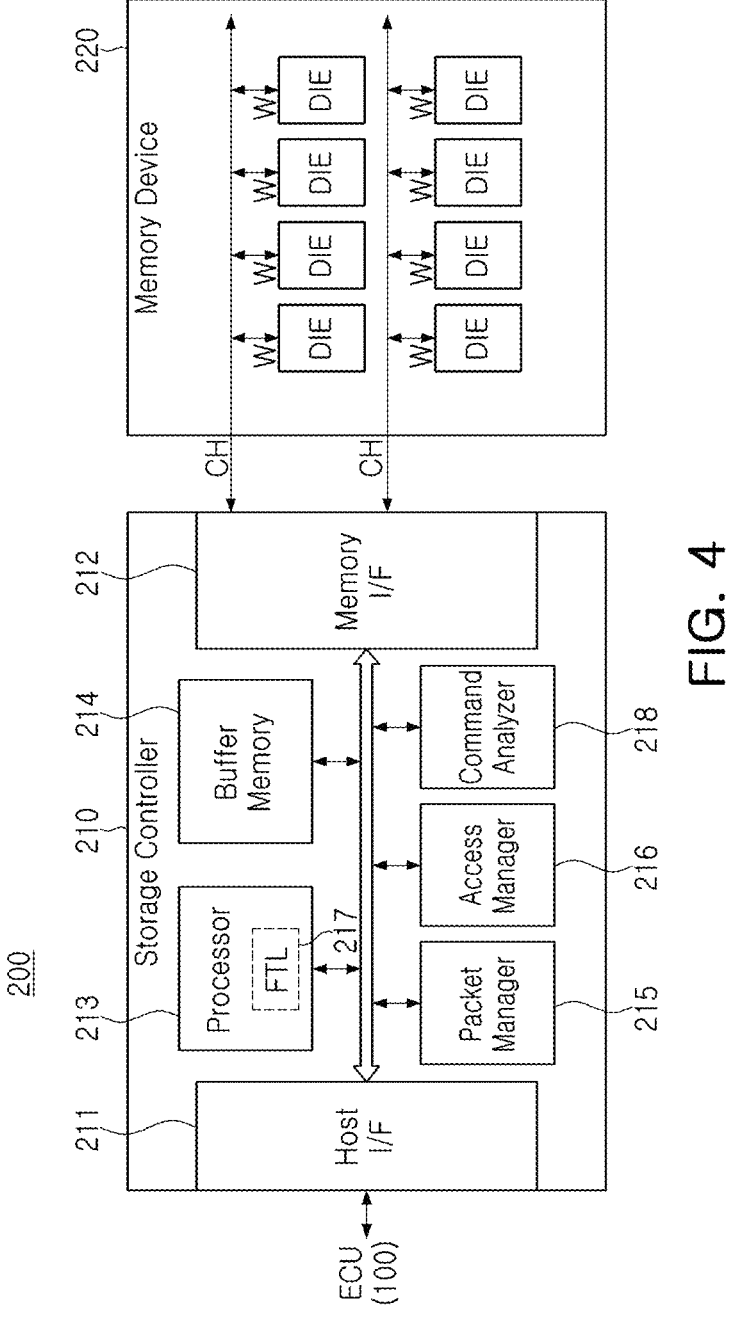
FIG. 4 is a diagram illustrating a storage device according to an example embodiment.

FIG. 4 is a diagram illustrating a storage device according to an example embodiment.

The storage device 200 may include a storage controller 210 and a memory device 220. The storage device 200 may include storage media for storing data in response to a request from an electronic control unit (ECU) 100. The electronic control unit (ECU) 100 may correspond to any of the plurality of electronic control units (ECUs) 110-150 described with reference to FIGS. 1 and 3.

In some embodiments, the storage device 200 may include at least one of a solid state drive (SSD), an embedded memory, or a removable external memory. When the storage device 200 is implemented as an SSD, the storage device 200 may follow the non-volatile memory express (NVMe) criterion.

In an embodiment, when the memory device 220 of the storage device 200 includes a flash memory, the flash memory may include a 2D NAND memory array or a 3D (or vertical) NAND (VNAND) memory array. In some embodiments, the storage device 200 may include various other types of nonvolatile memories. For example, in some embodiments, the storage device 200 may be implemented as a magnetic RAM (MRAM), a spin-transfer torque MRAM, a conductive bridging RAM (CBRAM), a ferroelectric RAM (FeRAM), a phase RAM (PRAM), and/or a resistive memory (Resistive RAM), and/or various other types of memory.

In some embodiments, the memory device 220 may include a plurality of memory dies DIE. Each of the plurality of memory dies DIE may include a plurality of memory blocks, and each of the plurality of memory blocks may include a plurality of memory cells. In a memory die DIE, an erase operation may be performed on a memory block unit.

In some embodiments, the plurality of memory dies DIE may be connected to the storage controller 210 through a plurality of channels CH and a plurality of ways W. In some embodiments, the memory dies DIE connected to a channel CH may perform command and data communication in sequence through a channel CH. In some embodiments, the memory dies DIEs may each receive a command may perform a command operation simultaneously and in parallel.

The storage controller 210 may include a host interface (I/F) 211, a memory interface (I/F) 212, a processor 213, a buffer memory 214 and a packet manager 215. In some embodiments, the storage controller 210 may include an access manager 216, a flash translation layer (FTL) 217 and a command analyzer 218.

In some embodiments, the storage controller 210 may include a working memory into which the FTL 217 is loaded, and data write and read operations on a nonvolatile memory may be controlled by the processor 213 by executing the FTL 217.

The host interface (I/F) 211 may transmit a packet to and receive a packet from the electronic control unit (ECU) 100. A packet transmitted from the electronic control unit 100 to the host interface 211 may include a command or data to be written to the memory device 220, and the packet transmitted from the host interface 211 to the electronic control unit 100 may include a response to a command or data read from the memory device 220.

The memory interface (I/F) 212 may transmit data to be written to the memory device 220 or may receive data read from the memory device 220. In some embodiments, the memory interface 212 may be implemented to comply with criterion protocols such as Toggle or ONFI.

The FTL 217 may perform several vehicle functions such as address mapping, wear-leveling, and/or garbage collection. The address mapping operation may be a function to change a logical address received from a host into a physical address used to actually store data in the memory device 220. The wear-leveling may be a function to prevent excessive deterioration of a specific block by ensuring that blocks in the memory device 220 are used uniformly, and may be implemented through firmware technology balancing erase counts of physical blocks, for example. The garbage collection may be a function to secure usable capacity in the memory device 220 by copying valid data of a block to a new block and erasing the existing block.

To use parallel processing performance of the memory dies DIE, the FTL 217 may configure memory blocks included in each of the memory dies DIE into a super-memory block. The memory blocks included in the super-memory block may control the memory blocks included in the super-memory block to operate in parallel. For example, in some embodiments, data may be programmed in parallel in pages of each of the memory blocks. In some embodiments, the memory blocks may be erased in parallel. Hereinafter, similarly to the storage area provided by the super-memory block, the storage area which may be erased simultaneously under control of FTL 217 may be referred to as an erase unit area.

The buffer memory 214 may temporarily store data to be written to the memory device 220, data to be read from the memory device 220, and/or metadata such as map data. In some embodiments, the buffer memory 214 may be a component provided in the storage controller 210. In some embodiments, the buffer memory 214 may be disposed externally of the storage controller 210.

In some embodiments, the packet manager 215 may generate a packet according to protocols of an interface with the electronic control unit 100. In some embodiments, the packet manager 215 may parse various information from a packet received from the electronic control unit 100.

According to an example embodiment, the electronic control unit 100 may provide a write command or a read command to the storage device 200 including a tag indicating an automobile safety level of a vehicle function for which a write operation or a read operation is to be performed. When the packet manager 215 receives a write command or a read command, the packet manager 215 may obtain an automobile safety level of the vehicle function from the tag included in the command.

The access manager 216 may selectively allow access to data depending on an automobile safety level of the vehicle function. For example, the access manager 216 may control the vehicle function to not access data having an automobile safety level higher than an automobile safety level thereof depending on an automobile safety level included in a read command.

The flash translation layer (FTL) 217 may determine an automobile safety level of data received from the vehicle function based on the automobile safety level of the vehicle function, and may separately store pieces of data having different automobile safety levels in different erase unit areas. In some embodiments, the FTL 217 may store an automobile safety level of data stored in each logical address and may control the vehicle function to not access data having an automobile safety level higher than the automobile safety level thereof.

In an example embodiment, the buffer memory 214 may separately store data to be written to the memory device 200 or data to be read from the memory device 200 in different areas depending on an automobile safety level.

The command analyzer 218 may dynamically adjust a size of buffer areas depending on an automobile safety level included in the buffer memory 214 by analyzing a write command received from the host 100.

Figure 5:
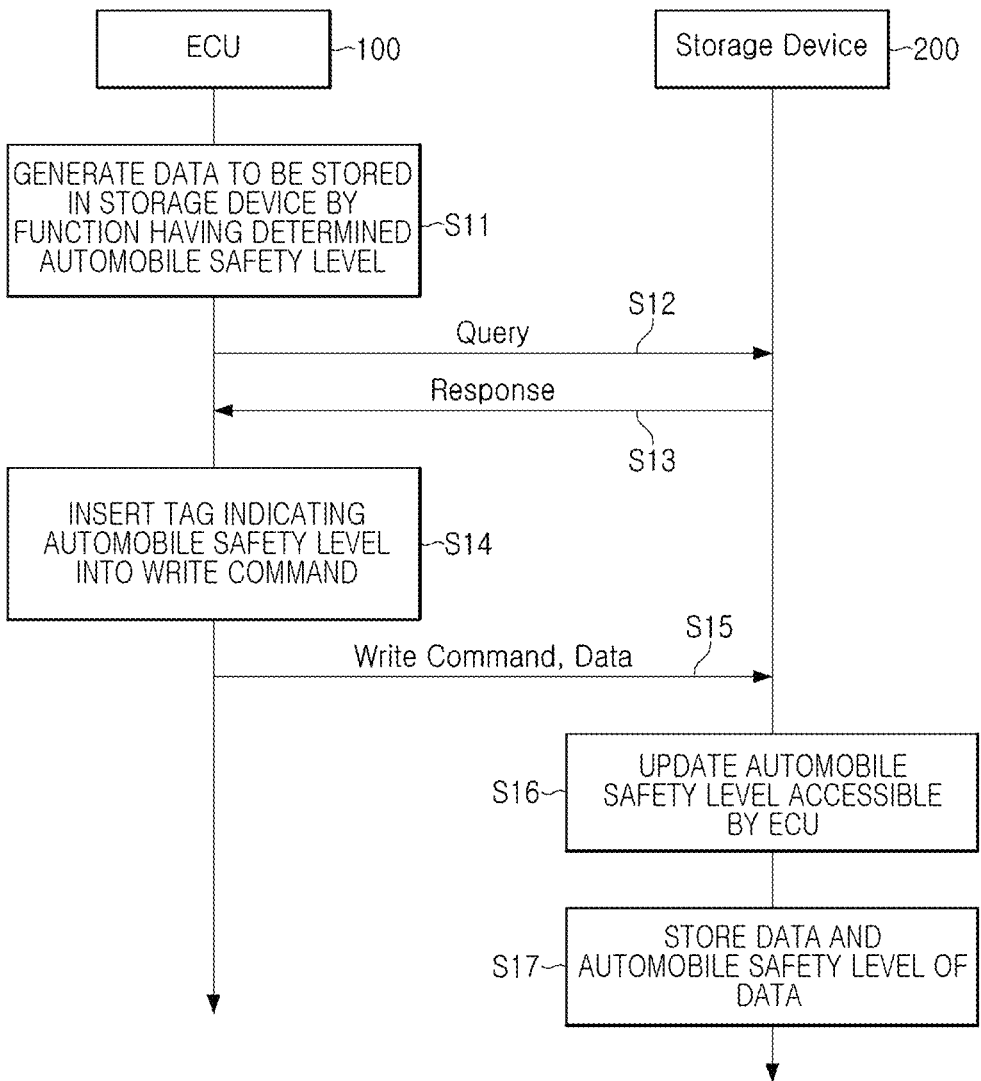
FIG. 5 is a diagram illustrating interaction between an electronic control device and a storage device according to an example embodiment.

FIG. 5 is a diagram illustrating interaction between an electronic control device and a storage device according to an example embodiment.

An electronic control unit (ECU) 100 and a storage device 200 in FIG. 5 may correspond to the electronic control unit (ECU) 100 and the storage device 200 described with reference to FIG. 4.

In operation S11, a vehicle function having a determined automobile safety level in the electronic control unit 100 may generate data to be stored in the storage device 200. For example, the vehicle function generating data may include the electronic control unit 100 executing the vehicle function, thereby obtaining data from a sensor connected to the electronic control unit 100, or processing data obtained from the sensor.

In operation S12, the electronic control unit 100 may provide a query to identify whether the storage device 200 supports command processing depending on an automobile safety level. In operation S13, the storage device 200 may provide a response to the query to the electronic control unit 100. For example, the storage device 200 may provide a response indicating that command processing is supported depending on an automobile safety level.

In operation S14, the electronic control unit 100 may insert a tag indicating the automobile safety level of the vehicle function into a write command commanding to store the generated data in the storage device 200. In operation S15, the electronic control unit 100 may provide the generated data and a write command into which the tag is inserted to the storage device 200.

In operation S16, the storage device 200 may update the automobile safety level which may be accessed by the electronic control unit 100. For example, the storage device 200 may store automobile safety levels having been requested by the electronic control unit 100 in an access management table and may control access of the electronic control unit 100 by referring to the access management table.

In operation S17, the storage device 200 may store the data that is received from the electronic control unit 100 and may store the automobile safety level included in the tag as the automobile safety level of the data.

According to an example embodiment, the automobile safety level of the data may be used by the storage device 200 to control access to the electronic control unit 100. In some embodiments, the storage device 200 may store pieces of data having different automobile safety levels in different erase unit areas depending on an automobile safety level of the data.

FIGS. 6A and 6B are diagrams illustrating a structure of a command including a tag according to some example embodiments.

A command may be included in a packet provided from the electronic control unit (ECU) 100 to the storage device 200. The command may have a defined structure between the electronic control unit 100 and the storage device 200. For example, a command may include a plurality of double words Dwords. In some embodiments, the indication of each bit of the Dwords may be defined in advance.

FIG. 6A is a diagram schematizing the structure of a command CMD. The command CMD may include a plurality of Dwords Dword0 to Dword15. In the example in FIG. 6A, bits [7:0] of Dword0 may indicate the type of opcode, that is, a command. For example, the value of the bits [7:0] of Dword0 may indicate whether the command CMD is a read command, a write command, or another command. Bits [b:a] may refer to bits from the a-th bit to the b-th bit.

The bits [31:0] of Dword1 may indicate a namespace identifier (NSID) to be accessed from the storage device 200. The storage device 200 may divide a physical storage space provided by the memory device into a plurality of logical storage spaces and may provide the spaces to an external entity, and each of the logical storage spaces may be referred to as a namespace. In an example embodiment, the storage device 200 may provide a different namespace for each of the electronic control units (ECUs) 100. The electronic control unit 100 may include the NSID of the namespace provided thereto in the bits [31:0] of Dword1.

According to an example embodiment, one or more bits which indicates a tag indicating an automobile safety level of a vehicle function in the command CMD may be predetermined. For example, the bits of Dword11 may be used to define a direct send command, and the bits [15:8] of Dword11 may correspond to a directive type (DTYPE) field which may indicate that the data is a portion of a group of related data. The DTYPE field may be pre-determined to include a tag indicating an automobile safety level.

FIG. 6B illustrates a relationship between a value of data bit included in a DTYPE field and an automobile safety level indicated by the value of the data bit. For example, a value of the DTYPE field '0x03' may indicate an ASIL QM level, '0x13' may indicate an ASIL A level, '0x23' may indicate an ASIL B level, '0x33' may indicate an ASIL C level, and '0x43' may indicate an ASIL D level. '0x53' may be reserved for other ASIL levels.

The packet manager 215 described with reference to FIG. 4 may determine the type of command by analyzing an Opcode field of a command included in the packet, may determine which electronic control unit the command is received from by analyzing the NSID field, and may determine the automobile safety level of the vehicle function that wants to access data by analyzing the DTYPE field. The storage controller 210 may process an access request from vehicle functions having various automobile safety levels according to results of the command analysis of the packet manager 215.

However, a command structure, a position of bit corresponding to a tag in the command structure, and the automobile safety level according to a value of the tag are not limited to the examples in FIGS. 6A and 6B.

Below, with reference to FIGS. 7, 8A and 8B, a method of processing a write command of a storage device according to an example embodiment is described in detail.

Figure 7:
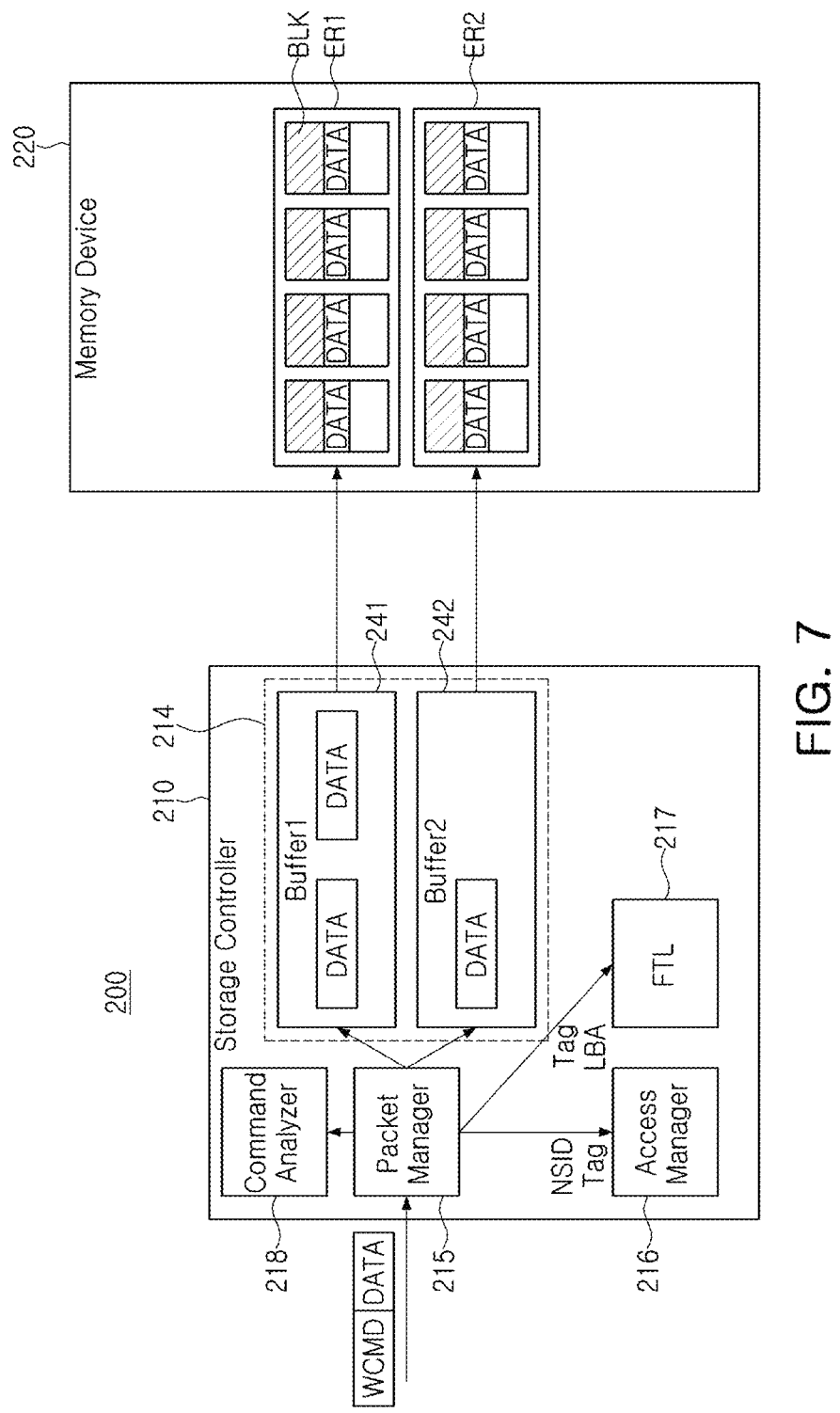
FIG. 7 is a diagram illustrating a storage device according to an example embodiment.

FIG. 7 is a diagram illustrating a storage device according to an example embodiment.

The storage device 200 in FIG. 7 may correspond to a storage device 200 described with reference to FIG. 4.

The memory device 220 may include a plurality of erase unit areas, including, for example, a first erase unit area ER1 and a second erase unit area ER2. An erase unit area may include a plurality of memory blocks BLK. The memory blocks BLK included in an erase unit area may be configured to be erased simultaneously, and may be memory blocks included in different memory dies.

The number of memory blocks included in the erase unit area is not limited to any particular example. In an example embodiment, memory blocks included in an erase unit area may be obtained from the entirety of the memory dies DIE of the memory device 220, or may be obtained from the memory dies DIE connected to a channel CH, or may be obtained from the memory dies DIE selected one by one from each of the channels CH.

The storage controller 210 may receive a write command WCMD and data DATA, and the packet manager 215 may analyze the write command WCMD. For example, the packet manager 215 may obtain the NSID of a namespace provided to the electronic control unit and a tag Tag indicating an automobile safety level of the vehicle function by analyzing the write command WCMD. The packet manager 215 may obtain a logical address LBA corresponding to the data DATA from the write command WCMD.

According to an example embodiment, the FTL 217 may determine a physical address of the area in which the data DATA may be stored in the memory device 220 according to the tag Tag and the logical address LBA obtained from the packet manager 215. Specifically, the FTL 217 may store pieces of data having different tags Tag in different erase unit areas.

In the example illustrated in FIG. 7, data having the first automobile safety level may be stored in the first erase unit area ER1, and data having the second automobile safety level may be stored in the second erase unit area ER2. As described with reference to FIG. 2, when automobile safety levels include five levels such as QM, A, B, C, and D, each of the automobile safety levels may be stored separately in five different erase unit areas.

Due to a physical structure of the memory device 220, when a read operation is performed on a page of a specific memory block, a read disturbance phenomenon in which data stored in other pages adjacent to the page is degraded may occur.

When the storage device 200 stores data in an erase unit area regardless of an automobile safety level, interference may occur between pieces of data having different automobile safety levels due to the read disturbance phenomenon. For example, when pieces of data having different automobile safety levels are stored in adjacent pages, data having a relatively high automobile safety level may be damaged by accessing data having a relatively low automobile safety level. For example, when data related to a brake function is damaged due to data related to a rear lighting function being continuously read, great danger may occur to the vehicle driver.

According to an example embodiment, pieces of data having different automobile safety levels may be stored separately in different erase unit areas, such that interference due to read disturbance between pieces of data having different automobile safety levels may be prevented. Accordingly, safety of the vehicle system including the storage device 200 may be improved.

In an example embodiment, the FTL 217 may determine a physical address such that data having a relatively high automobile safety level may be stored in an erase unit area having relatively high durability. For example, stress may be applied to the memory cells of the memory device 220 whenever an erase operation is performed, and erase unit areas may have durability determined by the number of program/erase (P/E) cycles, that is, the number of erase operations.

FTL 217 may determine a physical address to store data having a relatively high automobile safety level in an erase unit area having a relatively small number of erases among the plurality of erase unit areas. Accordingly, the storage device 200 may prevent damage to data having a relatively high automobile safety level.

The storage controller 210 may complete a write command WCMD operation by buffering the received data DATA in the buffer memory 214 and storing the buffered data in the erase unit area. In an example embodiment, the buffer memory 214 may include a plurality of buffer areas, including, for example, a first buffer area 241 and a second buffer area 242, for separately storing pieces of data having different automobile safety levels. For example, the buffer memory 214 may include a metadata buffer storing metadata such as map data, and an input/output data buffer for storing input/output data input by the electronic control unit 100 or output to the electronic control unit 100. The plurality of buffer areas 241 and 242 may be included in the input/output data buffer.

When pieces of data having different automobile safety levels are stored separately in the buffer memory 214, interference between pieces of data having different automobile safety levels may be further prevented.

In some embodiments, the size of plurality of buffer areas 241 and 242 may be fixed. However, in an example embodiment, a size of the plurality of buffer areas 241 and 242 may be dynamically adjusted. For example, the command analyzer 218 may analyze an automobile safety level indicated by a tag included in each of the write commands received from the host 100, a size of data received with each of the write commands, and/or an access frequency by the automobile safety level may be analyzed. In some embodiments, the command analyzer 218 may adjust the size of the plurality of buffer areas 241 and 242 based on data size and access frequency for each of the automobile safety levels. The storage controller 210 may use the access manager 216 and the FTL 217 to prevent a vehicle function having a relatively low automobile safety level from accessing data having a relatively high automobile safety level.

The access manager 216 may obtain an NSID and a tag Tag included in the write command WCMD from the buffer manager 215. Namespaces may be provided for each electronic control unit, and the access manager 216 may determine the electronic control unit providing the write command WCMD according to the NSID.

According to an example embodiment, the access manager 216 may collect automobile safety level information of vehicle functions providing a write command to the storage device 200 for each of the electronic control units. The access manager 216 may determine data access authority of the electronic control unit by referring to automobile safety level information for each of the electronic control units.

The FTL 217 may obtain a logical address LBA included in the write command WCMD and a physical address and a tag Tag mapped to the logical address LBA as map data. In some embodiments, the FTL 217 may prevent a vehicle function having a relatively low automobile safety level from accessing data having a relatively high automobile safety level by referring to the tag Tag mapped to the logical address LBA.

FIG. 8A is a diagram illustrating an access management table according to an example embodiment. FIG. 8B is a diagram illustrating a map table according to an example embodiment.

The access manager 216 as described with reference to FIG. 7 may store the automobile safety level of vehicle functions providing a write command to the storage device 200 in each of the plurality of electronic control units 110-140 as described with reference to FIG. 3.

FIG. 8A illustrates an access management table indicating an automobile safety level for each NSID. In the example in FIG. 8A, a namespace may be provided for each electronic control unit (ECU1-ECU4), and the electronic control unit and NSID may have a one-to-one correspondence. The access manager 216 may update the access management table based on the NSID and the tag Tag included in the write command WCMD.

For example, when an ASIL B level tag has been received along with the first NSID, and an ASIL D level tag has been received along with the first NSID, the automobile safety level corresponding to the first NSID in the access management table may be saved as the ASIL B level and the ASIL D level. The automobile safety level corresponding to the first NSID may indicate that vehicle functions storing data in the storage device 200 in the first electronic control unit 110 may have the ASIL B level and the ASIL D level.

According to an example embodiment, when a read command is received, the access manager 216 may determine whether to allow a read operation by referring to the NSID and the tag included in the read command and the NSID and the automobile safety level stored in the access management table.

Example embodiments are not limited to the example in which the electronic control unit and the NSID may have a one-to-one correspondence. For example, a plurality of namespaces may be provided for an electronic control unit. Even when the plurality of namespaces are provided for the electronic control unit, the access manager 216 may generate an access management table indicating the automobile safety level for each of the plurality of NSID.

Referring to FIG. 8B, the map table may represent a mapping relationship between a logical address, a physical address and a tag. For example, when the write command may include a tag indicating a first logical address LBA1 and an ASIL A level, the FTL 217 may determine the first physical address PPN1, which is a physical address of the area of the memory device 220 in which data corresponding to the first logical address LBA1 is stored. In some embodiments, the FTL 217 may store the mapping relationship between the first logical address LBA1 and the first physical address PPN1 in the map table, and may store the ASIL A level information as an automobile safety level corresponding to the first logical address LBA1 in the map table.

According to an example embodiment, by adding a tag indicating an automobile safety level to the map table indicating the mapping relationship between a logical address and a physical address, another table indicating the mapping relationship between the logical address and the tags may not be added, and the automobile safety level for each logical address may be stored. For example, in an example embodiment, a tag indicating the automobile safety level may consist of data of 1 byte or less. Accordingly, capacity burden of the buffer memory 214 storing an automobile safety level for each logical address may be alleviated.

In an example embodiment, the map table may be stored in the memory device 220, and the map table may be maintained in the memory device 220 even when power is not supplied to the storage device 200. In some embodiments, when the storage device 200 is booted, at least a portion of the map table stored in the memory device 220 may be loaded into the buffer memory 214 and may be referenced.

The map table may be managed by namespace. For example, the memory device 220 may store a plurality of map tables, each corresponding to a namespace. When a namespace is generated, a map table may be generated, and when a namespace is deleted, the map table corresponding to the deleted namespace may be removed. For example, when a delete command among namespace management commands is received from the electronic control unit 100, or the namespace is deleted in response to a secure erase command, the map table may be deleted from the memory device 220.

According to an example embodiment, when a read command is received, the FTL 217 may determine whether to allow a read operation by comparing a logical address and a tag included in the read command with the logical address and the automobile safety level stored in the map table.

In the description below, a method of processing a read command using the access manager 216 and the FTL 217 is described in detail with reference to FIG. 9.

Figure 9:
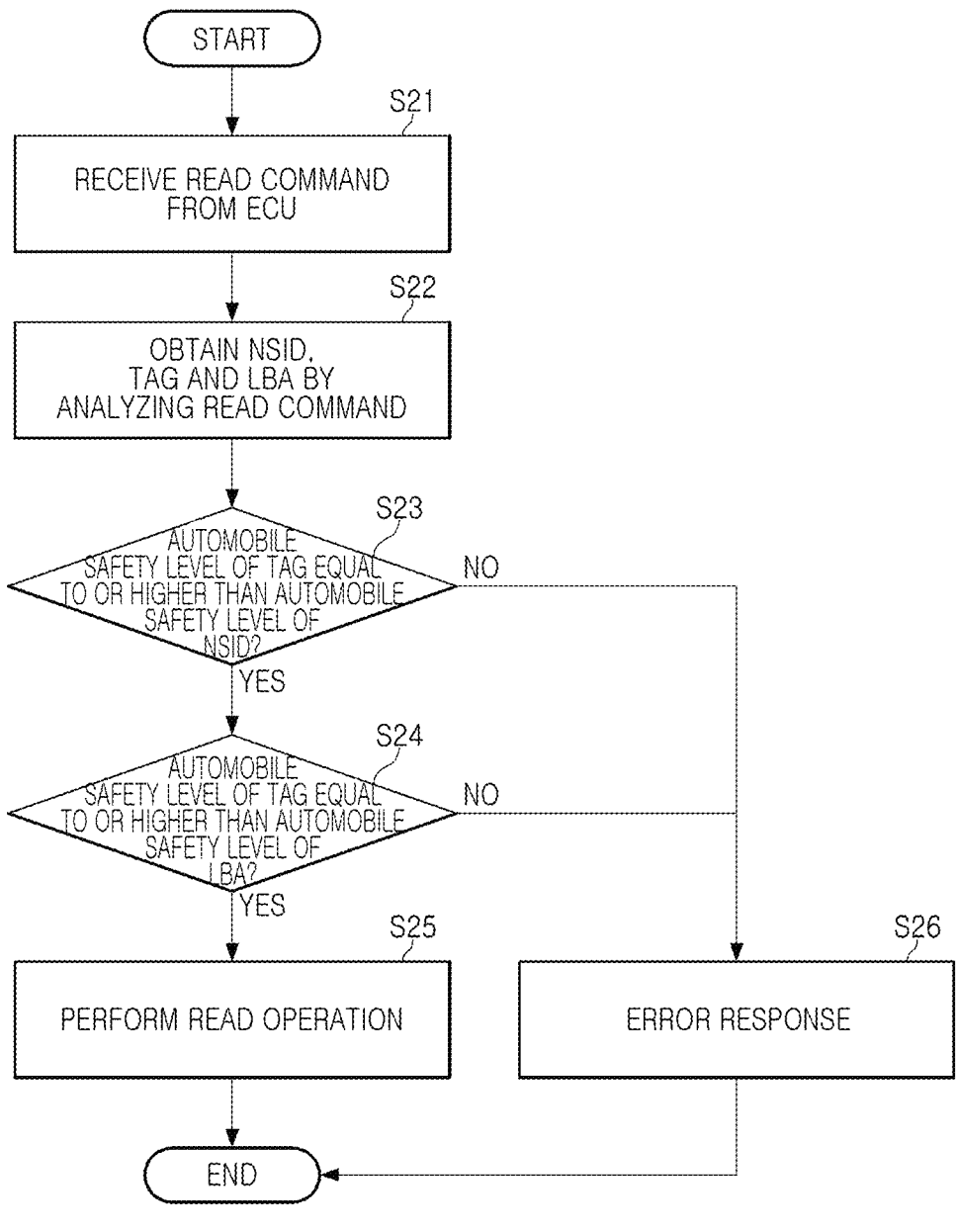
FIG. 9 is a flowchart illustrating an operation of a storage device according to an example embodiment.

FIG. 9 is a flowchart illustrating operation of a storage device according to an example embodiment.

The storage device may correspond to the storage device 200 described with reference to FIGS. 1 to 8.

In operation S21, the host interface 211 may receive a read command from the electronic control unit. The read command may include a NSID, a tag and a logical address, similarly to the write command WCMD described with reference to FIG. 7. In operation S22, a packet manager 215 may obtain a NSID, a tag and a logical address by analyzing the read command.

In operation S23, the access manager 216 may determine whether an automobile safety level indicated in the tag is equal to or higher than an automobile safety level of the NSID. The automobile safety level of the NSID may be obtained by referring to the access management table.

When the automobile safety level indicated in the tag is higher than the automobile safety level of the NSID ("Yes" in operation S23), the automobile safety level of the vehicle function generating the read command may be higher than the automobile safety level of the data having been written to date in the NSID. For example, when the automobile safety level of the NSID in the access management table is an ASIL B level and an ASIL D level, when the automobile safety level indicated in the tag is equal to or higher than the ASIL B level, "Yes" may be determined in operation S23. In this case, operation S24 may be performed to determine whether the automobile safety level indicated in the tag is equal to or higher than the automobile safety level of the logical address.

When the automobile safety level indicated in the tag is less than the automobile safety level of the NSID ("No" in operation S23), the automobile safety level of the vehicle function generating the read command may be lower than the automobile safety level of data having been written to date in the NSID. Accordingly, in operation S26, the storage controller 210 may provide an error response to the electronic control unit. In some embodiments, the storage controller 210 may block (or otherwise prevent) the vehicle function from accessing data and may provide the error response to the electronic control unit. For example, when the automobile safety level of the NSID is the ASIL B level and the ASIL D level, and the automobile safety level indicated in the tag is the ASIL A level or lower, operation S23 may be determined as "No."

When the automobile safety level indicated in the tag is the automobile safety level of the logical address or higher ("Yes" in operation S24), the automobile safety level of the vehicle function generating the read command may be sufficiently high to access the data corresponding to the logical address, such that, in operation S25, the storage controller 210 may perform a read operation on the logical address.

When the automobile safety level indicated in the tag is less than the automobile safety level of the logical address ("No" in operation S24), the storage controller 210 may provide an error response to the electronic control unit in operation S26. In some embodiments, the storage controller 210 may block (or otherwise prevent) the vehicle function from accessing data and may provide the error response to the electronic control unit. For example, when the automobile safety level indicated in the tag is the ASIL C level and the automobile safety level of the NSID is the ASIL B level and the ASIL D level, access may be determined based on the logical address. For example, access to data having ASIL B level may be allowed, but access to data having ASIL D level may be blocked. The storage controller 210 may control access to data by comparing the automobile safety level indicated in the tag with the automobile safety level of the logical address.

According to an example embodiment, the storage device may block a vehicle function having a relatively low automobile safety level from obtaining data having a relatively high automobile safety level, such that safety of the vehicle system may be improved.

As in operation S23 described above, when the vehicle safety function included in the read command received from the electronic control unit is lower than the vehicle safety function having been written by the electronic control unit, the storage device may preemptively block a read operation before searching the map table. Accordingly, a computation burden of the storage device 200 for controlling access may be improved.

According to an example embodiment described with reference to FIGS. 7 to 9, the storage device 200 may update the access management table in response to a write command from the electronic control unit, and may control a read operation by referring to the updated access management table in response to the read command of the electronic control unit.

However, example embodiments are not limited to the access management table controlling only a read operation. For example, in some embodiments, the access management table may be referenced to process a write command. In the description below, an operation of processing a write command of a storage device according to an example embodiment is described in detail with reference to FIG. 10.

Figure 10:
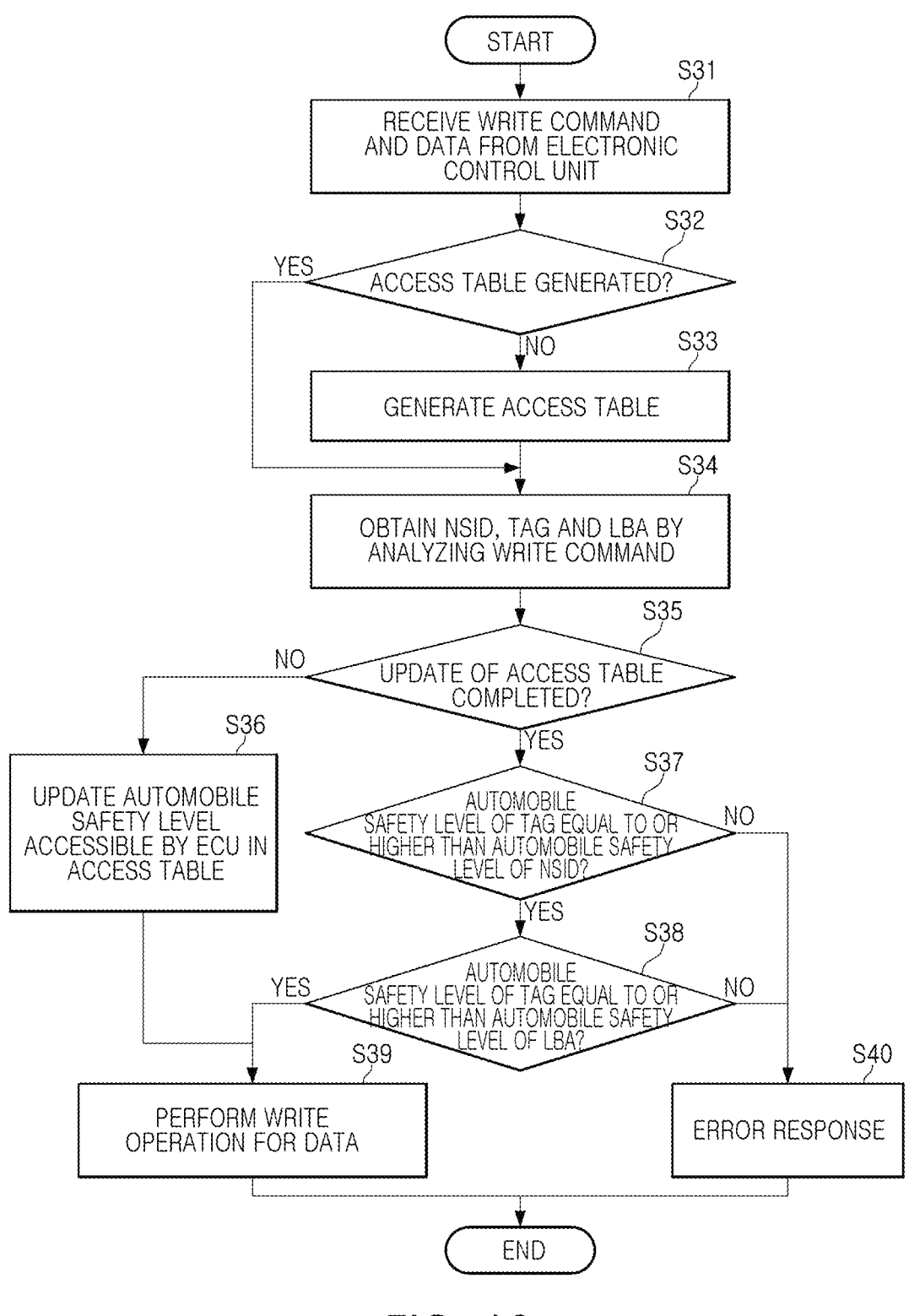
FIG. 10 is a flowchart illustrating an operation of a storage device according to an example embodiment.

FIG. 10 is a flowchart illustrating operation of a storage device according to an example embodiment.

In operation S31, a host interface 211 may receive a write command and data from an electronic control unit.

In operation S32, the access manager 216 may determine whether an access table for the storage device 200 has been generated. For example, in the first booting of a storage device 200, the access table may not be generated.

When the access table is not generated ("No" in operation S32), the access manager 216 may generate the access table in operation S33. When the access table has been generated ("Yes" in operation S32), the access manager 216 may skip operation S33 and proceed to operation S34.

In operation S34, packet manager 215 may obtain an NSID, a tag and a logical address by analyzing the write command received from the host interface 211. The logical address may refer to a logical address of the data.

In operation S35, the access manager 216 may identify whether the update of the access table has been completed.

When firmware of the electronic control unit 100 is updated, the vehicle function provided by the electronic control unit 100 may change, and the automobile safety level for each vehicle function may change. Until the firmware of the electronic control unit 100 is updated, the automobile safety level of the electronic control unit 100 may be fixed for each vehicle function.

For example, after the firmware of the electronic control unit 100 is updated, the access manager 216 may update the automobile safety level which may be accessed by the electronic control unit 100 in the access table in a determined period, and when the determined period elapses, the update of the access table may be terminated, and whether the write operation is allowed may be determined using the access table for which the update has been completed.

When the update of the access table is not completed ("No" in operation S35), the access manager 216 may update the access table with the automobile safety level which may be accessed by the electronic control unit 100 in operation S36.

When the update of the access table is completed ("Yes" in operation S35), the access manager 216 may determine whether the automobile safety level of the tag included in the write command is equal to or higher than the automobile safety level of the NSID by referring to the access management table in operation S37, thereby determining whether to allow a write operation for the data.

When the automobile safety level of the tag is equal to or higher than the automobile safety level of the NSID ("Yes" in operation S37), the storage controller 210 may perform operation S38.

When the automobile safety level of the tag is less than the automobile safety level of the NSID ("No" in operation S37), the storage controller 210 may output an error response to the electronic control unit in operation S40.

In operation S38, the FTL 217 may determine whether to allow a write operation for the data by determining whether the automobile safety level of the tag is equal to or higher than the automobile safety level of the logical address. The automobile safety level of the logical address may be determined by referring to the map table and finding the automobile safety level corresponding to the logical address included in the write command.

When the automobile safety level of the tag is equal to or higher than the automobile safety level of the logical address ("Yes" in operation S38), the FTL 217 may allow a write operation for the data in operation S39. In other words, when the automobile safety level of the vehicle function to write data to the logical address in the electronic control unit is higher than the automobile safety level of the data currently written to the logical address, the FTL 217 will allow updating of the data of the logical address. The FTL 217 may map the logical address to another physical address, may store the data in the area indicated by the physical address in the memory device 220, and may update the logical address, a physical address, and the automobile safety level indicated by the tag in the map table.

When the automobile safety level of the tag is less than the automobile safety level of the logical address ("No" in operation S38), the storage controller 210 may provide an error response to the electronic control unit in operation S40. In some embodiments, when the automobile safety level of the vehicle function is lower than the vehicle level of the data currently written to the logical address, the storage controller 210 may block the write operation and provide an error response to protect the previously written data.

According to an example embodiment, the storage device may block a vehicle function having a relatively low automobile safety level from directly changing data having a relatively high automobile safety level or causing program disturbance to the data, such that safety of a vehicle system may be improved.

The storage device according to an example embodiment described with reference to FIGS. 7 to 10 may store data having the same automobile safety level without distinguishing the erase unit area, but example embodiments are not limited thereto. For example, data having the same automobile safety level may be stored separately in the plurality of erase unit areas in accordance with additional criterions.

Figure 11:
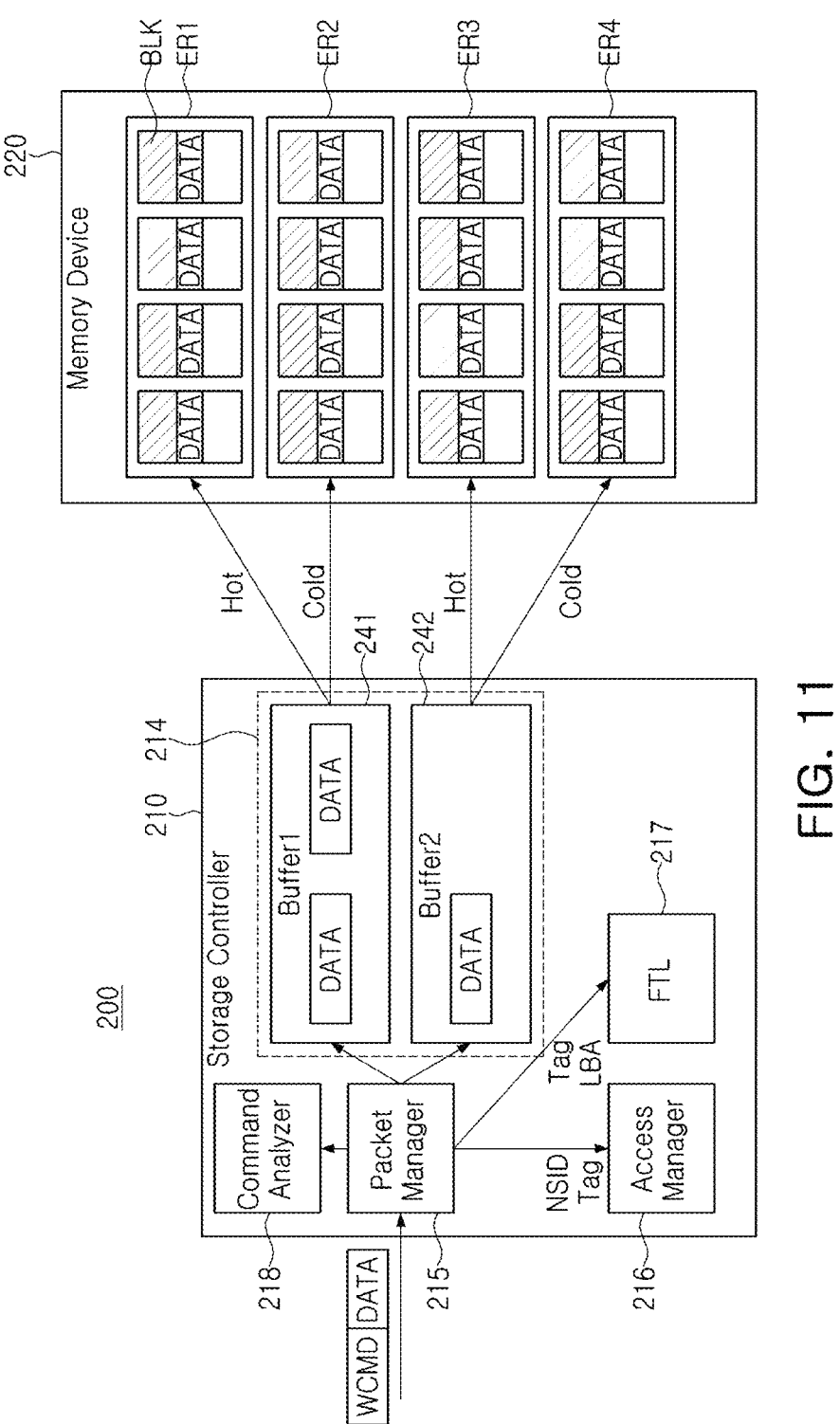
FIG. 11 is a diagram illustrating a storage device according to an example embodiment.

FIG. 11 is a diagram illustrating a storage device according to an example embodiment.

The storage device 200 in FIG. 11 may include a storage controller 210 and a memory device 220. The storage device 200 in FIG. 11 may correspond to the storage device 200 described with reference to FIG. 7.

Even when pieces of data have the same automobile safety level, the storage device 200 may store the pieces of separately in different erase unit areas depending on an access frequency of the data. For example, a FTL 217 may determine the automobile safety level of data according to a tag included in a write command, and may determine an access frequency of the data according to a logical address included in the write command. The FTL 217 may collect access frequency by logical address, may classify data having an access frequency equal to or higher than a criterion value as hot data, may classify data having an access frequency lower than criterion value as cold data, and may store hot data and cold data separately in different erase unit areas.

The memory device 220 may include a plurality of erase unit areas, including, for example, a first erase unit area ER1, a second erase unit area ER2, a third erase unit area ER3, and a fourth erase unit area ER4. As described with reference to FIG. 7, data having the first automobile safety level may be buffered in the first buffer area 241 and data having the second automobile safety level may be buffered in the second buffer area 242. In an example embodiment, among the pieces of data buffered in first buffer area 241, hot data may be stored in the first erase unit area ER1, and cold data may be stored in the second erase unit area ER2. In some embodiments, among the pieces of data buffered in the second buffer area 242, hot data may be stored in the third erase unit area ER3, and cold data may be stored in the fourth erase unit area ER4.

As described with reference to FIG. 7, in some embodiments, sizes of the first buffer area 241 and the second buffer area 242 may be fixed. In some embodiments, the sizes of the first buffer area 241 and the second buffer area 242 may be dynamically adjusted based on the received data size and access frequency for each automobile safety level by a command analyzer 218.

FIG. 11 illustrates an example in which pieces of data having different automobile safety levels and data having the same automobile safety level are stored separately in different erase unit areas depending on access frequency, but example embodiments are not limited thereto. For example, in some embodiments, data having the same automobile safety level may be stored separately depending on a lifespan, that is, update frequency.

When the storage device 200 is applied to the vehicle system, the storage device 200 may be exposed to various and rapidly changing circumstances. For example, the storage device 200 may be exposed to various temperature conditions depending on a position of a vehicle, or may be exposed to hazardous conditions such as vehicle collision and fire, or power supply may become unstable.

When data generated by the electronic control unit under hazardous conditions is not normally stored in the storage device 200, it may be difficult to control the vehicle system normally. In particular, when data having a relatively high safety level is damaged, accidents may occur due to malfunction of the vehicle system. Also, it may be difficult to perform danger analysis using data stored in the storage device 200 after hazardous conditions are removed.

According to an example embodiment, the storage device 200 may effectively protect data having a relatively high automobile safety level by processing data received from the electronic control unit based on external conditions of the vehicle. In the description below, operations of the vehicle system and the storage device according to an example embodiment will be described in detail with reference to FIGS. 12 to 14.

Figure 12:
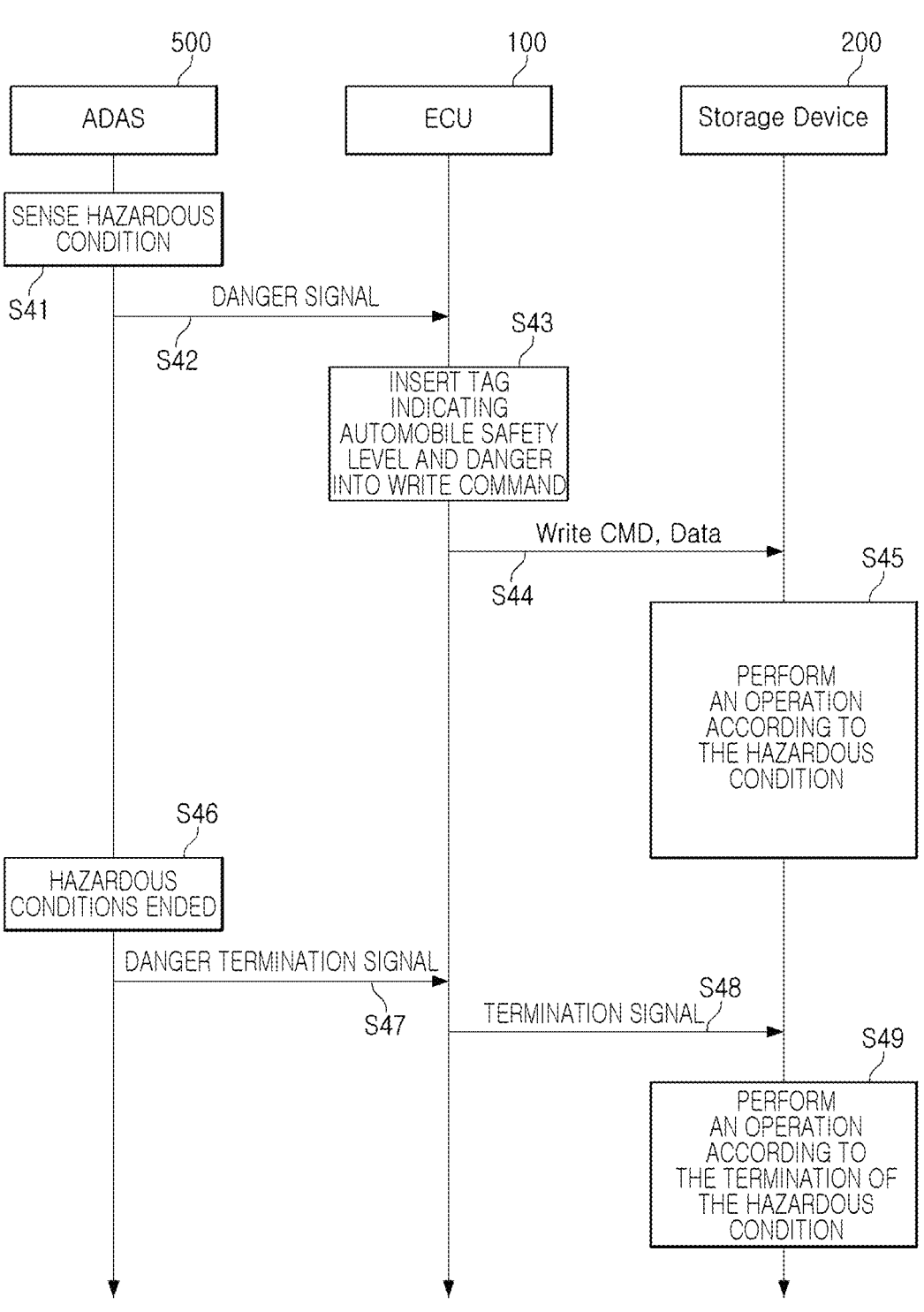
FIG. 12 is a diagram illustrating interactions among components in a vehicle system according to an example embodiment.

FIG. 12 is a diagram illustrating interaction of a vehicle system according to an example embodiment.

The vehicle system may include an electronic control unit (ECU) 100, a storage device 200 and an advanced driver assistance system (ADAS) 500. The electronic control unit 100, the storage device 200 and the ADAS 500 may correspond to the components having the same reference designators described with reference to FIGS. 1 and 3.

In operation S41, ADAS 500 may sense a hazardous condition. For example, the ADAS 500 may sense hazardous conditions based on data obtained from sensors 351 and 352 as described with reference to FIG. 1. For example, the ADAS 500 may use a position sensor to sense hazardous conditions in which a distance to surrounding objects is shorter than a criterion value, or may sense hazardous conditions in which temperature of the vehicle is higher than a criterion value using a temperature sensor.

In operation S42, the ADAS 500 may provide a danger signal notifying hazardous conditions to the electronic control unit 100. The electronic control unit 100 may correspond to at least one of a plurality of electronic control units (ECUs) 110-150 described with reference to FIGS. 1 and 3. The ADAS 500 may provide a danger signal to the electronic control units related to the hazardous conditions among the plurality of electronic control units 110-150. For example, when the danger of a frontal collision is sensed, the ADAS 500 may provide a danger signal to the first and second electronic control units 110 and 120 associated with sensors and actuators disposed on the front side of the vehicle.

In operation S43, the electronic control unit 100 may insert a tag indicating automobile safety level and danger into a write command whenever generating a write command in response to the danger signal. For example, one or more flag bits indicating danger may be added to the tag as described with reference to FIG. 6A, and the one or more flag bits may indicate the danger by being determined to a determined value such as "1."

In operation S44, the electronic control unit 100 may provide a write command and data to which the one or more flag bits is added to the storage device 200.

In operation S45, the storage device 200 may perform an operation according to hazardous conditions in response to a sense signal. For example, in an example embodiment, the storage device 200 may store data received from the electronic control unit 100 under hazardous conditions in the first erase unit area or the second erase unit area having different levels of bit density depending on the automobile safety level of the data. For example, when the automobile safety level of the received data is equal to or higher than a threshold level, the storage device 200 may store the data in the first erase unit area having a relatively low bit density. Operation S43 will be described later with reference to FIG. 13.

In operation S46, ADAS 500 may sense that the hazardous condition has ended. For example, the ADAS 500 may sense that the hazardous condition has ended based on data obtained from the sensor.

In operation S47, the ADAS 500 may provide a danger termination signal notifying the electronic control unit 100 that the hazardous condition has ended.

In operation S48, the electronic control unit 100 may provide a termination signal notifying the storage device 200 that the hazardous condition has ended. After the hazardous condition has ended, the electronic control unit 100 may reset the one or more flag bits included in the tag of the write command to a value such as "0" whenever generating a write command.

In operation S49, the storage device 200 may perform an operation according to the termination of the hazardous condition in response to the termination signal. For example, in an exemplary embodiment, when the hazardous condition ends, the storage device 200 may move data stored in the first erase unit area under the hazardous condition to the second erase unit area having relatively high bit density. The operation of operation S46 will be described later with reference to FIG. 14.

In an example embodiment, the hazardous condition and the operation following the termination of the hazardous condition of the storage device 200 may be individually controlled depending on each of the plurality of electronic control units.

For example, when a danger signal is provided from the ADAS 500 to the first and second electronic control units 110 and 120, and the storage device 200 receives write commands including a tag indicating danger only from the first and second electronic control units 110 and 120, the storage device 200 may perform operation S45 on data received from the first and second electronic control units 110 and 120. However, in some embodiments, data received from the third and fourth electronic control units 130-140 in the same period may be stored in erase unit areas having the same bit density regardless of automobile safety level.

Figure 13:
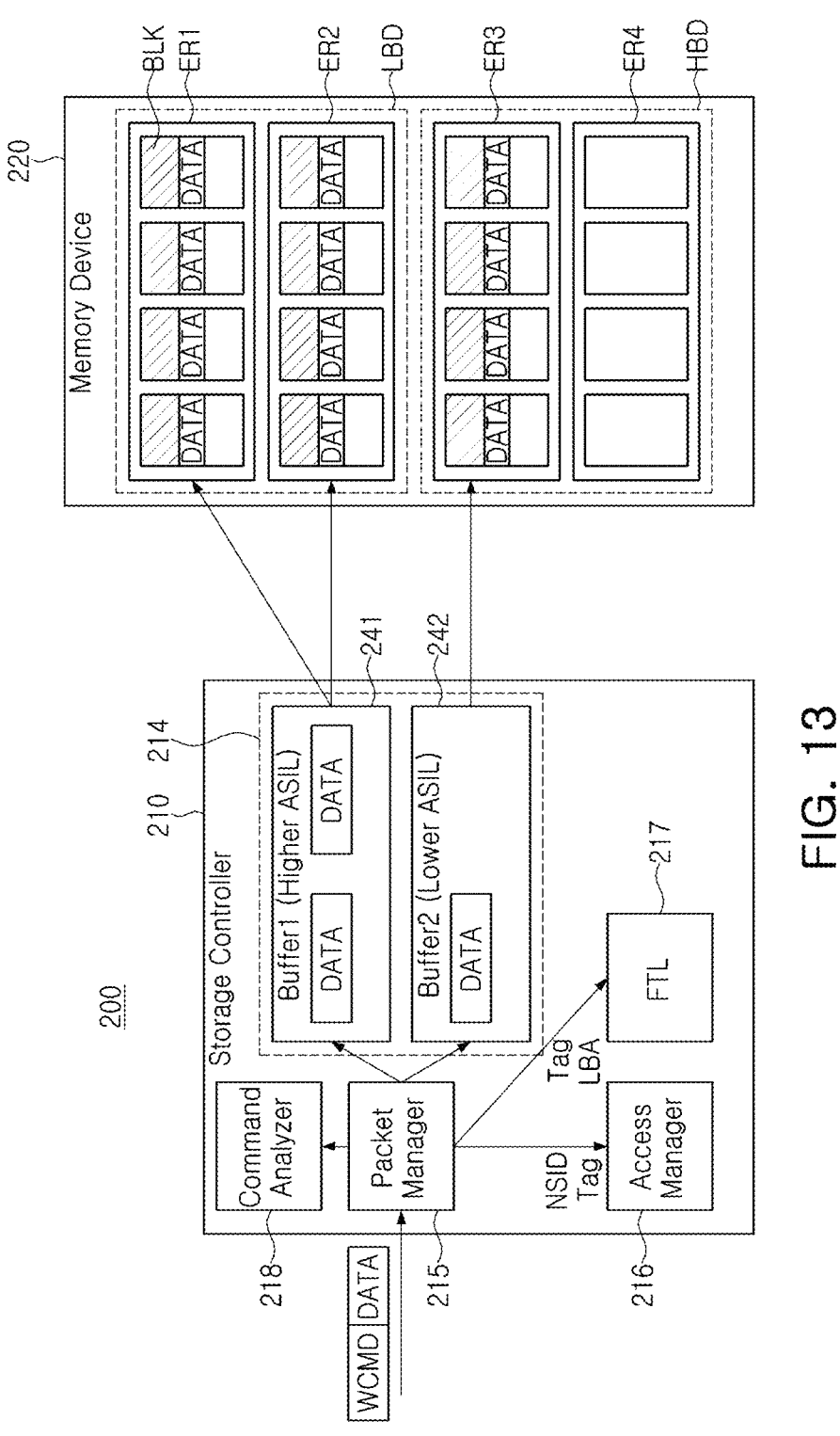
FIG. 13 is a diagram illustrating a storage device according to an example embodiment.

FIG. 13 is a diagram illustrating a storage device according to an example embodiment.

The storage device 200 in FIG. 13 may correspond to the storage device 200 described with reference to FIG. 7. The storage device 200 may store data in erase unit areas having different levels of bit density depending on an automobile safety level in hazardous conditions.

The memory device 220 may have erase unit areas having different bit densities depending on the number of data bits which may be stored in a memory cell. For example, the memory device 220 may include an erase unit area having single-level cell (SLC) memory blocks for storing 1 bit of data in a memory cell, an erase unit area having multi-level cell (MLC) memory blocks for storing 2 bits of data in a memory cell, an erase unit area having triple-level cell (TLC) memory blocks for storing 3 bits of data in a memory cell, and an erase unit area having quadruple level cell (QLC) memory blocks for storing 4 bits of data in a memory cell.

FIG. 13 illustrates a first area LBD including erase unit areas ER1 and ER2 having relatively low bit density, and a second area HBD including erase unit areas ER3 and ER4 having relatively high bit density. For example, the erase unit areas of the first area LBD may include SLC memory blocks, and the erase unit areas of the second area HBD may include TLC memory blocks or QLC memory blocks.

According to an example embodiment, the storage controller 210 may store data having an automobile safety level equal to or higher than the threshold level in hazardous conditions in the erase unit areas ER1 and ER2 having relatively low bit density. For example, the storage controller 210 may store data of which the automobile safety level is an ASIL D level or higher in the erase unit areas ER1 and ER2 including SLC memory blocks.

The storage controller 210 may store data of which the automobile safety level is less than the ASIL D level in the erase unit areas ER3 and ER4 including the TLC memory blocks. As described with reference to FIG. 7, when the automobile safety levels lower than the ASIL D level include QM, A, B, and C, data may be stored in four different erase unit areas depending on an automobile safety level.

In the erase unit area having a relatively low bit density, since a voltage margin between threshold voltage states indicating data is relatively large, data may be programmed swiftly and may be read swiftly and accurately.

As described with reference to FIG. 7, the buffer memory 214 may include a plurality of buffer areas 241 and 242 for separately storing pieces of data having different automobile safety levels. In an example embodiment, the command analyzer 218 may dynamically change sizes of the plurality of buffer areas 241 and 242 when write commands including a tag indicating danger are received. For example, when the command analyzer 218 receives write commands including a tag indicating danger, the command analyzer 218 may further increase the size of the first buffer area 241 storing data having a higher automobile safety level than the size of the second buffer area 242 storing data having a lower automobile safety level.

According to an example embodiment, the storage controller 210 may swiftly and safely store data generated in a vehicle function having a relatively high automobile safety level under hazardous conditions, thereby preventing loss of the data. According to an example embodiment, the storage controller 210 may accurately read the data, such that malfunction of a vehicle function having a relatively high automobile safety level may be prevented in hazardous conditions and safety of the vehicle system may improve.

In an example embodiment, the storage controller 210 may mirror the same data in the erase unit areas ER1 and ER2. In other words, the second erase unit area ER2 may store a copy of the data stored in the first erase unit area ER1. In an example embodiment, the storage controller 210 may protect data from damage by mirroring the data having a relatively high automobile safety level.

Figure 14:
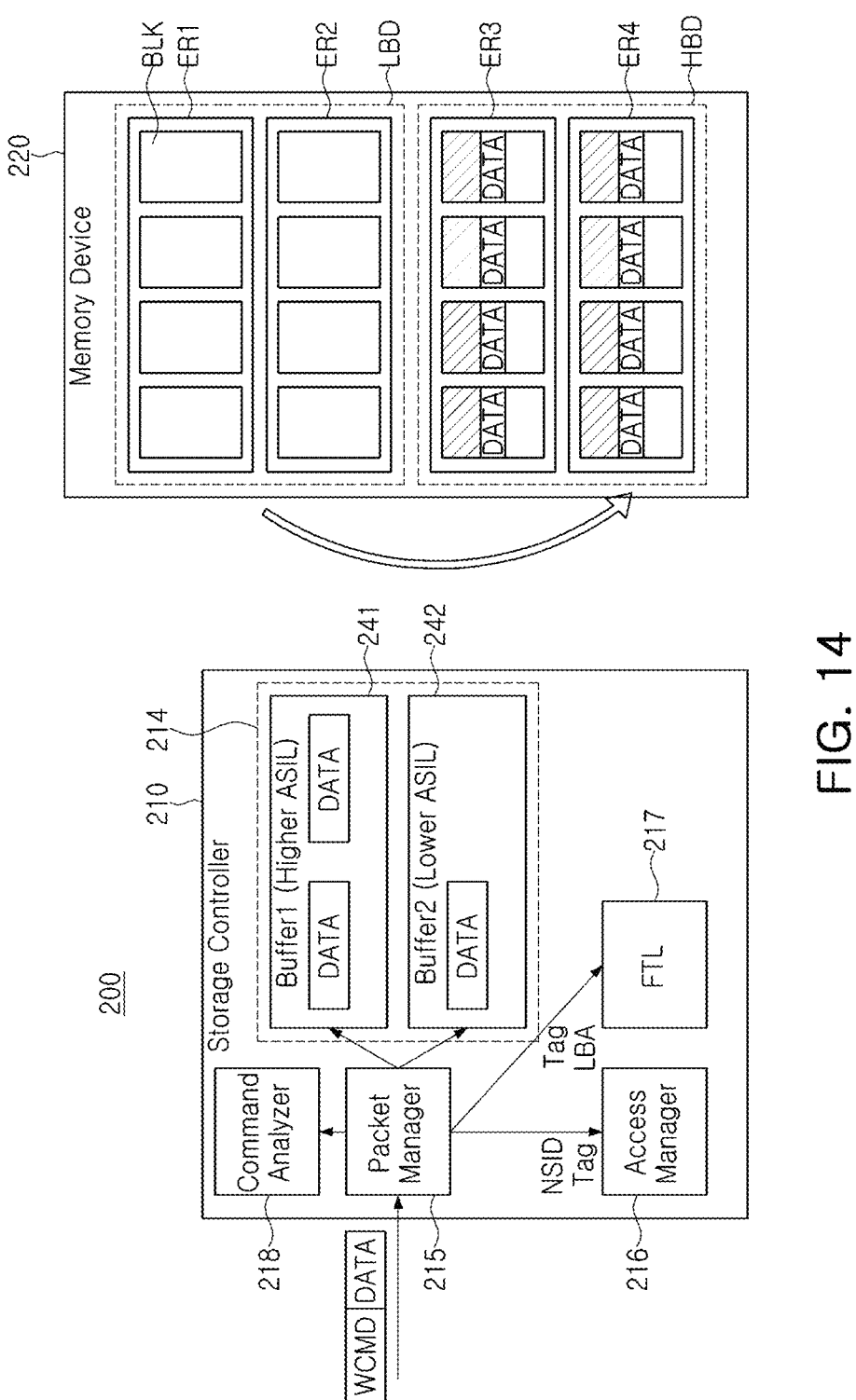
FIG. 14 is a diagram illustrating a storage device according to an example embodiment.

FIG. 14 is a diagram illustrating a storage device according to an example embodiment.

The storage device 200 in FIG. 14 may correspond to a storage device 200 described with reference to FIG. 13. The storage device 200 may move data stored in erase unit areas having relatively low bit density to erase unit areas having relatively high bit density when hazardous conditions end.

In the example in FIG. 14, the storage controller 210 may copy data stored in first and second erase unit areas ER1 and ER2 to third and fourth erase unit areas ER3 and ER4 and may control the memory device 220 to perform an erase operation on the first and second erase unit areas ER1 and ER2.

According to an example embodiment, when a hazardous condition ends, the storage device 200 may move the data stored in the first and second erase unit areas ER1 and ER2 to the third and fourth erase unit areas ER3 and ER4, thereby providing storage in the second area LBD having relatively low bit density.

In an example embodiment, when the hazardous condition is terminated, the electronic control unit 100 may provide data stored in the hazardous conditions storage device 200 to an external server, thereby allowing the external server to perform analysis of danger of the vehicle system. For example, data stored in the storage device 200 under the hazardous condition may be used for danger analysis for the same purpose as data stored in an event data recorder (EDR).

The storage device according to an example embodiment described with reference to FIGS. 1 to 14 may be applied to a vehicle system having a single root input/output virtualization (SR-IOV) architecture. In the description below, an example of a vehicle system having an SR-IOV architecture will be described with reference to FIG. 15.

Figure 15:
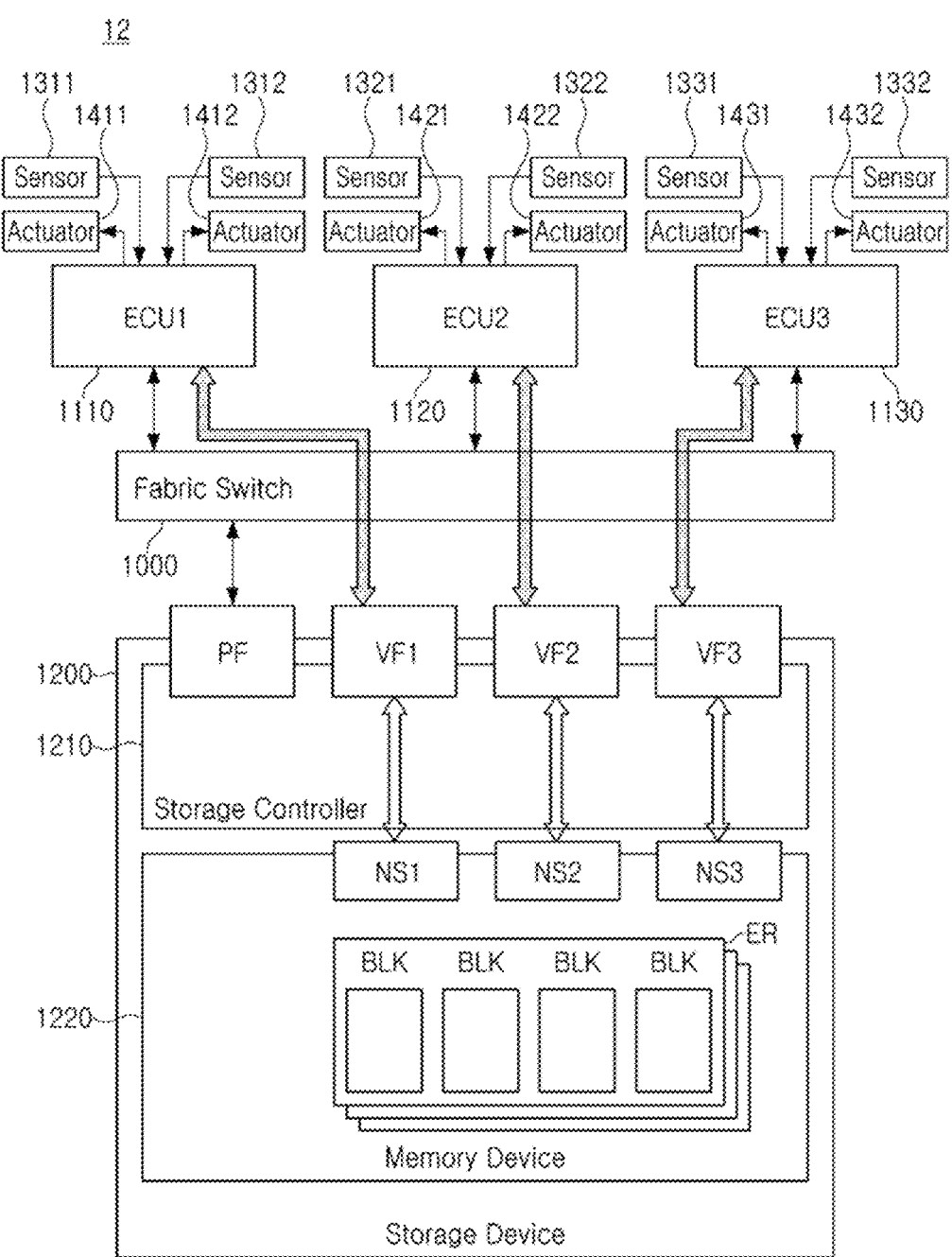
FIG. 15 is a diagram illustrating a vehicle system according to an example embodiment.

FIG. 15 is a diagram illustrating a vehicle system according to an example embodiment.

A vehicle system 12 may include a plurality of electronic control units (ECUs) 1110, 1120 and 1130, a storage device 1200, a fabric switch 1000, a plurality of sensors 1311, 1312, 1321, 1322, 1331, and 1332 and a plurality of actuators 1411, 1412, 1421, 1422, 1431, and 1432.

The plurality of electronic control units (ECUs) 1110-1130 may be similar to the plurality of electronic control units 110-140 described with reference to FIG. 3. For example, at least one sensor and at least one actuator may be connected to each of the plurality of electronic control units 1110-1130, and the plurality of electronic control units 1110-1130 may control the at least one actuator using data obtained from the at least one sensor.

The storage device 1200 may be similar to the storage device 200 described with reference to FIGS. 3 and 4. The storage device 1200 may include a storage controller 1210 and a memory device 1220.

The fabric switch 1000 may support communication between the plurality of electronic control units 1110-1130 and the storage device 1200. The storage device 1200 may be shared by the plurality of electronic control units 1110-1130.

The SR-IOV architecture may provide a plurality of virtual devices for ease of management and performance improvement when a plurality of physical devices or virtual devices share an input/output device. For example, when storage device 1200 is configured as an end-point device supporting SR-IOV, the storage device 1200 may provide one or more physical function PFs corresponding to input/output ports, and the physical function PF may provide a plurality of virtual functions VF1-VF3. The physical function PF may be managed by the fabric switch 100, and each of the plurality of virtual functions VF may be allocated to the plurality of electronic control units 1110-1130.

The plurality of virtual functions VF1-VF3 may provide independent storage space to the plurality of electronic control units 1110-1130. For example, the storage controller 1210 may configure the storage space provided by the memory device 1220 to be a plurality of namespaces NS1-NS3, and may provide the plurality of namespaces NS1-NS3 to the plurality of virtual functions VF1-VF3. For example, the memory device 1220 may include a plurality of erase unit areas ER, each of which may include memory blocks BLK accessible in parallel, and the logical storage space provided by the plurality of erase unit areas ER may include the plurality of namespaces NS1-NS3.

The access command provided to the storage device 1200 may include a virtual function identifier. The storage controller 1210 may determine a virtual function for which the access command is provided.

As described with reference to FIG. 3, each of the plurality of electronic control units 1110-1130 may execute functions having various automobile safety levels, such that data provided from the plurality of electronic control units 1110-1130 to the storage device 1200 may have various automobile safety levels.

According to an example embodiment, the storage device 1200 may prevent interference, such as read disturbance, between pieces of data having different automobile safety levels by storing pieces of data having different automobile safety levels in different erase unit areas ER. In an example embodiment, when data of different virtual functions have the same safety level, the data may be stored in the same erase unit area ER.

According to an example embodiment, the storage device 1200 may configure an access management table for each virtual function and may perform an access management operation.

FIG. 16 is a diagram illustrating an access management table according to an example embodiment.

Referring to FIG. 16, an access management table may indicate an automobile safety level for each of virtual functions VF1-VF3.

As described with reference to FIG. 15, a virtual function may be provided for each of electronic control units, and the electronic control unit and a virtual function identifier (VFID) may have a one-to-one correspondence.

According to an example embodiment, the access management table may be updated based on the VFID and a tag included in a write command. According to an example embodiment, the storage controller 210 may control a read operation or a write operation by referring to the VFID and the tag and the access management table included in the read command or the write command.

According to the aforementioned example embodiments, the storage device may store data separately in different erase unit areas depending on the safety level of data generated from hardware devices of an autonomous vehicle, such that physical interference of data may be excluded and safety of the autonomous vehicle may be improved.

According to the aforementioned example embodiments, the storage device may store data having a relatively high safety level among pieces of data generated during a danger period of an autonomous vehicle in a memory area having a relatively low cell bit density, such that danger data may be stored swiftly and safely, and the stored data may be provided as data for danger analysis for the same purpose as data from an event data recorder (EDR).

While various example embodiments have been illustrated and described above, it will be understood to those skilled in the art that modifications and variations may be made without departing from the scope in the example embodiment as defined by the appended claims.

What is claimed is:

1. A storage device comprising:

a memory device having a plurality of erase unit areas including a first erase unit area and a second erase unit area, the second erase unit area having a second bit density higher than a first bit density of the first erase unit area; and a storage controller configured to:

receive a write command including a tag indicating a danger from a first electronic control unit among a plurality of electronic control units, based on an automobile safety level of data received with the write command being greater than or equal to a threshold level, store the data in the first erase unit area, and based on the automobile safety level of the data being lower than the threshold level, store the data in the second erase unit area; and based on a danger termination signal being received from the first electronic control unit, move the data received with the write command and stored in the first erase unit area, to the second erase unit area.

2. The storage device of claim 1, wherein the storage controller is configured to mirror the data stored in the first erase unit area to a third erase unit area among the plurality of erase unit areas before the danger termination signal is received.

3. The storage device of claim 1, wherein the storage controller is configured to, before the danger termination signal is received, store data received from a second electronic control unit among the plurality of electronic control units in different areas among the plurality of erase unit areas depending on an automobile safety level, and wherein the different areas have a same bit density.

4. The storage device of claim 1, wherein the first erase unit area includes single-level cell (SLC) memory blocks, the second erase unit area includes triple-level cell (TLC) memory blocks, and the threshold level is configured as an automotive safety integrity level (ASIL) D level.

5. A storage device comprising:

a memory device including a plurality of erase unit areas; and a storage controller configured to:

receive a write command and data from a first electronic control unit among a plurality of electronic control units, obtain an automobile safety level of a vehicle function that generated the write command from a tag included in the write command, and control the memory device to store the data in the plurality of erase unit areas depending on the automobile safety level of the vehicle function, wherein the storage controller controls the memory device to store pieces of the data having different automobile safety levels in different erase unit areas of the plurality of erase unit areas, wherein the storage controller stores an access management table indicating automobile safety levels of vehicle functions that access the storage device for each of the plurality of electronic control units, and updates the automobile safety level of the vehicle function indicated by the tag in the access management table to an automobile safety level for the first electronic control unit.

6. The storage device of claim 5, wherein the storage controller is configured to receive a read command from the first electronic control unit, obtain an automobile safety level indicated by a tag included in the read command, compare the automobile safety level indicated by the tag included in the read command with the automobile safety level for the first electronic control unit stored in the access management table, and selectively allow execution of a read operation according to a comparison result.

7. The storage device of claim 5, wherein the storage controller is configured to store a map table indicating a mapping of logical addresses used in the plurality of electronic control units and physical addresses of the memory device, and automobile safety levels, and to update the mapping of a logical address, a physical address, and the automobile safety level indicated in the tag included in the write command in the map table.

8. The storage device of claim 7, wherein the storage controller is configured to receive a read command from one of the plurality of electronic control units, to obtain a tag indicating an automobile safety level and a logical address from the read command, to compare the automobile safety level indicated by the tag from the read command with the automobile safety level of the logical address stored in the map table, and to selectively allow execution of a read operation according to a comparison result.

9. The storage device of claim 5, wherein the storage controller is configured to classify the received data into hot data and cold data depending on an access frequency of the data, and to control the memory device to store the hot data and the cold data among the pieces of the data having a same automobile safety level in different erase unit areas among the plurality of erase unit areas.

10. The storage device of claim 5, wherein the storage controller is configured to allocate data received from different ones of the plurality of electronic control units to different namespaces, and to control the memory device to store the pieces of the data having a same automobile safety level in a same erase unit area regardless of namespaces to which the data are allocated.

11. The storage device of claim 5, wherein each of the plurality of erase unit areas includes memory blocks that are accessible simultaneously.

12. The storage device of claim 5, wherein the automobile safety level of the vehicle function is configured as an automotive safety integrity level (ASIL) level.

13. A storage device comprising:

a memory device; and a storage controller configured to control the memory device, wherein the storage controller includes a processor configured to:

obtain a logical address included in a read command from a first electronic control unit among a plurality of electronic control units and to obtain an automobile safety level included in a tag of the read command;

determine whether a first automobile safety level included in the tag is greater than or equal to a second automobile safety level of data having been written previously in the memory device by the first electronic control unit; and based on the first automobile safety level being greater than or equal to the second automobile safety level, determine whether the first automobile safety level is greater than or equal to a third automobile safety level of data stored in the logical address, and based on the first automobile safety level being greater than the third automobile safety level, perform a read operation on the logical address.

14. The storage device of claim 13, wherein the processor is further configured to receive write commands from the plurality of electronic control units and to update an access management table that indicates an automobile safety level having been written for each of the plurality of electronic control units, based on a tag included in each of the write commands.

15. The storage device of claim 14, wherein the processor is further configured to:

based on a period elapsing after firmware of one of the plurality of electronic control units is updated, termi-nate updating of the access management table, based on obtaining a fourth automobile safety level included in a write command received from a second electronic control unit among the plurality of electronic control units, determine whether the fourth automobile safety level is greater than a fifth automobile safety level of data having been written previously in the memory device by the second electronic control unit based on the access management table, and based on the fourth automobile safety level being less than or equal to the fifth automobile safety level, output an error response for the write command.

16. The storage device of claim 14, wherein the storage controller provides different namespaces for the plurality of electronic control units, respectively, and wherein the processor updates the access management table based on a namespace identifier (NSID) included in the read command.

17. The storage device of claim 16, wherein the storage controller provides different virtual functions to the plurality of electronic control units, respectively, and wherein the processor updates the access management table based on a virtual function identifier (VFID) included in the read command.

18. The storage device of claim 13, wherein the processor is further configured to output an error response for the read command based on the first automobile safety level being less than the second automobile safety level.

19. The storage device of claim 13, wherein the processor is configured to output an error response for the read command based on the first automobile safety level being less than the third automobile safety level.

* * * * *